US011623346B2

(12) United States Patent
Colasanto et al.

(10) Patent No.: US 11,623,346 B2
(45) Date of Patent: Apr. 11, 2023

(54) CONFIGURATION OF ROBOTS IN MULTI-ROBOT OPERATIONAL ENVIRONMENT

(71) Applicant: REALTIME ROBOTICS, INC., Boston, MA (US)

(72) Inventors: Luca Colasanto, Boston, MA (US); Sean Murray, Cambridge, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 261 days.

(21) Appl. No.: 17/153,662

(22) Filed: Jan. 20, 2021

(65) Prior Publication Data
US 2021/0220994 A1 Jul. 22, 2021

Related U.S. Application Data

(60) Provisional application No. 62/964,405, filed on Jan. 22, 2020.

(51) Int. Cl.
*B25J 9/16* (2006.01)
*G06N 3/12* (2006.01)
*G06N 3/126* (2023.01)

(52) U.S. Cl.
CPC ........... *B25J 9/1666* (2013.01); *B25J 9/1669* (2013.01); *B25J 9/1682* (2013.01); *G06N 3/126* (2013.01); *G05B 2219/40417* (2013.01)

(58) Field of Classification Search
CPC ........ B25J 9/1602; B25J 9/1605; B25J 9/163; B25J 9/1661; B25J 9/1664; B25J 9/1666;
(Continued)

(56) References Cited

U.S. PATENT DOCUMENTS

| 4,862,373 A | 8/1989 | Meng |
| 4,949,277 A | 8/1990 | Trovato et al. |

(Continued)

FOREIGN PATENT DOCUMENTS

| EP | 1901150 A1 | 3/2008 |
| EP | 2306153 A2 | 4/2011 |

(Continued)

OTHER PUBLICATIONS

Pires, et al., "Robot Trajectory Planning Using Multi-objective Genetic Algorithm Optimization," 2004, Genetic and Evolutionary Computation—GECCO 2004, pp. 615-626 (Year: 2004).*

(Continued)

*Primary Examiner* — Spencer D Patton
(74) *Attorney, Agent, or Firm* — Cozen O'Connor

(57) ABSTRACT

Solutions for multi-robot configurations are co-optimized, to at least some degree, across a set of non-homogenous parameters based on a given set of tasks to be performed by robots in a multi-robot operational environment. Non-homogenous parameters may include two or more of: the respective base position and orientation of the robots, an allocation of tasks to respective robots, respective target sequences and/or trajectories for the robots. Such may be executed pre-runtime. Output may include for each robot: workcell layout, an ordered list or vector of targets, optionally dwell time durations at respective targets, and paths or trajectories between each pair of consecutive targets. Output may provide a complete, executable, solution to the problem, which in the absence of variability in timing, can be used to control the robots without any modification. A genetic algorithm, e.g., Differential Evolution, may optionally be used in generating a population of candidate solutions.

24 Claims, 9 Drawing Sheets

(58) Field of Classification Search
CPC ...... B25J 9/1669; B25J 9/1671; B25J 9/1682; G05B 2219/40417; G06N 3/12; G06N 3/126

See application file for complete search history.

(56) References Cited

U.S. PATENT DOCUMENTS

| | | | |
|---|---|---|---|
| 5,347,459 | A | 9/1994 | Greenspan et al. |
| 5,544,282 | A | 8/1996 | Chen et al. |
| 6,004,016 | A | 12/1999 | Spector |
| 6,049,756 | A | 4/2000 | Libby |
| 6,089,742 | A | 7/2000 | Warmerdam et al. |
| 6,259,988 | B1 | 7/2001 | Galkowski et al. |
| 6,493,607 | B1 | 12/2002 | Bourne et al. |
| 6,526,372 | B1 | 2/2003 | Orschel et al. |
| 6,526,373 | B1 | 2/2003 | Barral |
| 6,539,294 | B1 | 3/2003 | Kageyama |
| 7,865,277 | B1 | 1/2011 | Larson et al. |
| 8,315,738 | B2 | 11/2012 | Chang et al. |
| 8,571,706 | B2 | 10/2013 | Zhang et al. |
| 8,666,548 | B2 | 3/2014 | Lim |
| 8,825,207 | B2 | 9/2014 | Kim et al. |
| 8,855,812 | B2 | 10/2014 | Kapoor |
| 8,972,057 | B1 | 3/2015 | Freeman et al. |
| 9,102,055 | B1 | 8/2015 | Konolige et al. |
| 9,280,899 | B2 | 3/2016 | Biess et al. |
| 9,632,502 | B1 | 4/2017 | Levinson et al. |
| 9,645,577 | B1 | 5/2017 | Frazzoli et al. |
| 9,687,982 | B1 | 6/2017 | Jules et al. |
| 9,687,983 | B1 | 6/2017 | Prats |
| 9,731,724 | B2 | 8/2017 | Yoon |
| 9,981,383 | B1 | 5/2018 | Nagarajan |
| 10,035,266 | B1 | 7/2018 | Kroeger |
| 10,099,372 | B2 | 10/2018 | Vu et al. |
| 10,124,488 | B2 | 11/2018 | Lee et al. |
| 10,131,053 | B1 | 11/2018 | Sampedro et al. |
| 10,430,641 | B2 | 10/2019 | Gao |
| 10,705,528 | B2 | 7/2020 | Wierzynski et al. |
| 10,723,024 | B2 | 7/2020 | Konidaris et al. |
| 10,782,694 | B2 | 9/2020 | Zhang et al. |
| 2002/0074964 | A1 | 6/2002 | Quaschner et al. |
| 2003/0155881 | A1 | 8/2003 | Hamann et al. |
| 2004/0249509 | A1 | 12/2004 | Rogers et al. |
| 2005/0071048 | A1 | 3/2005 | Watanabe et al. |
| 2005/0216181 | A1 | 9/2005 | Estkowski et al. |
| 2006/0235610 | A1 | 10/2006 | Ariyur et al. |
| 2006/0247852 | A1 | 11/2006 | Kortge et al. |
| 2007/0112700 | A1 | 5/2007 | Den et al. |
| 2008/0125893 | A1 | 5/2008 | Tilove et al. |
| 2008/0234864 | A1 | 9/2008 | Sugiura et al. |
| 2009/0192710 | A1 | 7/2009 | Eidehall et al. |
| 2009/0295323 | A1 | 12/2009 | Papiernik et al. |
| 2009/0326711 | A1 | 12/2009 | Chang et al. |
| 2009/0326876 | A1 | 12/2009 | Miller |
| 2010/0235033 | A1 | 9/2010 | Yamamoto et al. |
| 2011/0066282 | A1 | 3/2011 | Bosscher et al. |
| 2011/0153080 | A1 | 6/2011 | Shapiro et al. |
| 2012/0010772 | A1 | 1/2012 | Pack et al. |
| 2012/0083964 | A1 | 4/2012 | Montemerlo et al. |
| 2012/0215351 | A1 | 8/2012 | McGee et al. |
| 2014/0012419 | A1 | 1/2014 | Nakajima |
| 2014/0025201 | A1 | 1/2014 | Ryu et al. |
| 2014/0025203 | A1 | 1/2014 | Inazumi |
| 2014/0067121 | A1 | 3/2014 | Brooks et al. |
| 2014/0121833 | A1 | 5/2014 | Lee et al. |
| 2014/0147240 | A1 | 5/2014 | Noda et al. |
| 2014/0249741 | A1 | 9/2014 | Levien et al. |
| 2014/0251702 | A1 | 9/2014 | Berger et al. |
| 2014/0309916 | A1 | 10/2014 | Bushnell |
| 2015/0051783 | A1 | 2/2015 | Tamir et al. |
| 2015/0134111 | A1 | 5/2015 | Nakajima |
| 2015/0261899 | A1 | 9/2015 | Atohira et al. |
| 2015/0266182 | A1 | 9/2015 | Strandberg |
| 2016/0001775 | A1 | 1/2016 | Wilhelm et al. |
| 2016/0107313 | A1 | 4/2016 | Hoffmann et al. |
| 2016/0112694 | A1 | 4/2016 | Nishi et al. |
| 2016/0121487 | A1 | 5/2016 | Mohan et al. |
| 2016/0154408 | A1 | 6/2016 | Eade et al. |
| 2016/0299507 | A1 | 10/2016 | Shah et al. |
| 2016/0357187 | A1 | 12/2016 | Ansari |
| 2017/0004406 | A1 | 1/2017 | Aghamohammadi |
| 2017/0028559 | A1 | 2/2017 | Davidi et al. |
| 2017/0120448 | A1 | 5/2017 | Lee et al. |
| 2017/0123419 | A1 | 5/2017 | Levinson et al. |
| 2017/0132334 | A1 | 5/2017 | Levinson et al. |
| 2017/0146999 | A1 | 5/2017 | Cherepinsky et al. |
| 2017/0157769 | A1 | 6/2017 | Aghamohammadi et al. |
| 2017/0168485 | A1 | 6/2017 | Berntorp et al. |
| 2017/0168488 | A1 | 6/2017 | Wierzynski et al. |
| 2017/0193830 | A1 | 7/2017 | Fragoso et al. |
| 2017/0210008 | A1 | 7/2017 | Maeda |
| 2017/0305015 | A1 | 10/2017 | Krasny et al. |
| 2018/0001472 | A1 | 1/2018 | Konidaris et al. |
| 2018/0001476 | A1 | 1/2018 | Tan et al. |
| 2018/0029233 | A1 | 2/2018 | Lager |
| 2018/0074505 | A1 | 3/2018 | Lv et al. |
| 2018/0113468 | A1 | 4/2018 | Russell |
| 2018/0136662 | A1 | 5/2018 | Kim |
| 2018/0150077 | A1 | 5/2018 | Danielson et al. |
| 2018/0172450 | A1 | 6/2018 | Lalonde et al. |
| 2018/0173242 | A1 | 6/2018 | Lalonde et al. |
| 2018/0222051 | A1 | 8/2018 | Vu et al. |
| 2018/0229368 | A1 | 8/2018 | Leitner et al. |
| 2018/0281786 | A1 | 10/2018 | Oyaizu et al. |
| 2019/0143518 | A1 | 5/2019 | Maeda |
| 2019/0163191 | A1 | 5/2019 | Sorin et al. |
| 2019/0164430 | A1 | 5/2019 | Nix |
| 2019/0196480 | A1 | 6/2019 | Taylor |
| 2019/0232496 | A1 | 8/2019 | Graichen et al. |
| 2019/0262993 | A1 | 8/2019 | Cole et al. |
| 2019/0293443 | A1 | 9/2019 | Kelly et al. |
| 2019/0391597 | A1 | 12/2019 | Dupuis |
| 2020/0069134 | A1 | 3/2020 | Ebrahimi Afrouzi et al. |
| 2020/0097014 | A1 | 3/2020 | Wang |
| 2020/0331146 | A1 | 10/2020 | Vu et al. |
| 2020/0338730 | A1 | 10/2020 | Yamauchi et al. |
| 2020/0338733 | A1 | 10/2020 | Dupuis et al. |
| 2020/0353917 | A1 | 11/2020 | Leitermann et al. |
| 2020/0368910 | A1 | 11/2020 | Chu et al. |

FOREIGN PATENT DOCUMENTS

| | | |
|---|---|---|
| EP | 3250347 A1 | 12/2017 |
| EP | 3486612 A1 | 5/2019 |
| EP | 3725472 A1 | 10/2020 |
| JP | 11296229 A | 10/1999 |
| JP | 2002073130 A | 3/2002 |
| JP | 2003127077 A | 5/2003 |
| JP | 2006224740 A | 8/2006 |
| JP | 2008065755 A | 3/2008 |
| JP | 2010061293 A | 3/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2018505788 A | 3/2018 |
| KR | 19980024584 A | 7/1998 |
| KR | 20110026776 A | 3/2011 |
| KR | 20130112507 A | 10/2013 |
| KR | 20170018564 A | 2/2017 |
| KR | 20170044987 A | 4/2017 |
| KR | 20170050166 A | 5/2017 |
| KR | 20180125646 A | 11/2018 |
| TW | 201318793 A | 5/2013 |
| WO | 9924914 A1 | 5/1999 |
| WO | 2015113203 A1 | 8/2015 |
| WO | 2016122840 A1 | 8/2016 |
| WO | 2017168187 A1 | 10/2017 |

(56) References Cited

FOREIGN PATENT DOCUMENTS

| WO | 2017214581 A1 | 12/2017 |
|---|---|---|
| WO | 2019183141 A1 | 9/2019 |
| WO | 2020040979 A1 | 2/2020 |
| WO | 2020117958 A1 | 6/2020 |

OTHER PUBLICATIONS

Kalawoun, "Motion planning of multi-robot system for airplane stripping," 2019, Université Clermont Auvergne (Year: 2019).*
Kapanoglu, et al., "A pattern-based genetic algorithm for multi-robot coverage path planning minimizing completion time," 2012, Journal of Intelligent Manufacturing 23, pp. 1035-1045 (Year: 2012).*
Hassan, "Modeling and Stochastic Optimization of Complete Coverage under Uncertainties in Multi-Robot Base Placements," 2016, Intelligent Robots and Systems (IROS) (Year: 2016).*
Hassan, et al., "An Approach to Base Placement for Effective Collaboration of Multiple Autonomous Industrial Robots," 2015 IEEE International Conference on Robotics and Automation (ICRA), pp. 3286-3291 (Year: 2015).*
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189 (Year: 2014).*
Hassan, et al., "Simultaneous area partitioning and allocation for complete coverage by multiple autonomous industrial robots," 2017, Autonomous Robots 41, pp. 1609-1628 (Year: 2017).*
International Search Report and Written Opinion, dated Apr. 22, 2021, for International Application No. PCT/US/2021/013610, 9 pages.
International Search Report and Written Opinion for PCT/US2021/061427, dated Apr. 29, 2022, 14 pages.
Non-Final Office Action Issued in U.S. Appl. No. 16/909,096 dated May 6, 2022, 49 pages.
or.pdf (Or | Definition of Or by Merriam-Webster, Sep. 9, 2019, https://www.merriam-webster.com/dictionary/or, pp. 1-12; Year: 2019.
Sicilliano et al. "Robotics. Modelling, Planning and Control", Chapter 12: Motion Planning, pp. 523-559, 2009.
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.
Chen, Chao , Motion Planning for Nonholonomic Vehicles with Space Exploration Guided Heuristic Search, 2016, IEEE.com, Whole Document, 140 pages.
Corrales, J.A. , et al., Safe Human-robot interaction based on dynamic sphere-swept line bounding volumes, Robotic and Computer-Integrated Manufacturing 27 (2011) 177-185, 9 page.
Hauck, Scott , et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E. , et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean , et al., "Robot Motion Planning on a Chip", Robotics: Science and Systems; Jun. 2016; 9 pages.
Murray, Sean , et al., "The microarchitecture of a real-time robot motion planning accelerator", 2016 49th Annual IEEE/ACM International Symposium on Microarchitecture (Micro), IEEE, Oct. 15, 2016, 12 pages.
Pan, Jia , et al., Efficient Configuration Space Construction and Optimization for Motion Planning, 2015, Research Robotics, Whole Document, 12 pages.

Pobil, Angel P, et al., "A New Representation for Collision Avoidance and Detection", Proceedings of the 1992 IEEE, XP000300485, pp. 246-251.
Rodriguez, Carlos , et al., "Planning manipulation movements of a dual-arm system considering obstacle removing", Robotics and Autonomous Systems 62 (2014), ELSEVIER, Journal homepage: www.elsevier.com/locate/robot, pp. 1816-1826.
Sato, Yuichi , et al., "Efficient Collision Detection using Fast Distance-Calculation Algorithms for Convex and Non-Convex Objects", Proceeding of the 1996 IEEE, XP-000750294, 8 pages.
Stilman, Mike , et al., "Manipulation Planning Among Movable Obstacles", Proceedings of the IEEE Int. Conf. on Robotics and Automation, Apr. 2007.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Bharathi Akilan et al: "Feed-rate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
Extended EP Search Report dated Jul. 18, 2022 EP App No. 20832308.9-1205, 10 pages.
Extended EP Search Report dated Jul. 25, 2022 EP App No. 20857383.2-1205, 10 pages.
Sonja MacFarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Final Office Action dated Sep. 7, 2022, for U.S. Appl. No. 16/909,096, 54 pages.
Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Non Final Office Action for U.S. Appl. No. 16/883,376, dated Sep. 27, 2022, 26 pages.
Non-Final Office Action dated Sep. 14, 2022, for U.S. Appl. No. 16/999,339, 18 pages.
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Extended EP Search Report dated Nov. 7, 2022, EP App No. 21744840.6-1205, 14 pages.
Klampfl Erica et al: "Optimization of workcell layouts in a mixed-model assembly line environment", International Journal of Flex-

(56) References Cited

OTHER PUBLICATIONS ible Manufacturing Systems, Kluwer Academic Publishers, Boston, vol. 17, No. 4, 23 pages, Oct. 10, 2006.
Long Tao et al: "Optimization on multi-robot workcell layout in vertical plane", Information and Automation (ICIA), 2011 IEEE International Conference On, IEEE, Jun. 6, 2011, 6 pages.
Pashkevich AP et al: "Multiobjective optimisation of robot location in a workcell using genetic algorithms", Control '98. UKACC International Conference On (Conf. Publ. No. 455) Swansea, UK Sep. 1-4, 1998, London, UK, vol. 1, Sep. 1, 1998, 6 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.

\* cited by examiner

Params: $K\_max > K\_inv > K\_unf > K\_c > K\_t$ $$\text{cost(candidate)} = \begin{cases} \text{pow}(10.0, \\ \log10(K\_max) - (\log10(K\_max) - \log10(K\_inv)) * \text{candidate\_validity\_rate}) & \text{INVALID candidate} \\ \\ \text{pow}(10.0, \\ \log10(K\_inv) - \log10(K\_inv) - \log10(K\_unf)) * \text{task\_reachability}) & \text{VALID candidate} \\ & \text{INFEASIBLE task-plan} \\ \\ K\_t * \text{task\_duration} + \\ K\_c * (\text{pow}(10.0, \log10(K\_unf/K\_c + 1) * \text{collision\_rate}) - 1) & \text{VALID candidate} \\ & \text{FEASIBLE task-plan} \end{cases}$$

*FIG.7*

|  | Priority1 | | | Priority2 | | | Priority3 | | |
|---|---|---|---|---|---|---|---|---|---|
|  | Robot1 | Robot2 | Robot3 | Robot1 | Robot2 | Robot3 | Robot1 | Robot2 | Robot3 |
| Task1 |  | * |  |  |  |  |  |  |  |
| Task2 |  |  |  | * |  |  |  |  |  |
| Task3 |  |  | * |  |  |  |  |  |  |
| Task4 |  |  |  |  |  |  |  |  | * | example 2D matrix that represents candidate solution

*FIG. 9*

CONFIGURATION OF ROBOTS IN MULTI-ROBOT OPERATIONAL ENVIRONMENT

TECHNICAL FIELD

The present disclosure generally relates to robot configuration in a multi-robot operation environment or shared workspace, and to the optimization of robot configuration in such an environment or shared workspace.

BACKGROUND

Description of the Related Art

Various applications employ or may wish to employ two or more robots in a multi-robot operational environment that is common to, or otherwise shared by, two or more robots. The multi-robot operational environment may take the form of a shared workspace. For example, two or more robots may be employed in performing tasks on or with one or more objects or work pieces in a common operational environment, for instance threading bolts to a chassis where the robots may overlap in range of motion.

Motion planning is a fundamental problem in robot control and robotics. A motion plan specifies a path that a robot can follow from a starting state to a goal state, typically to complete a task without colliding with any obstacles in an operational environment or with a reduced possibility of colliding with any obstacles in the operational environment. Challenges to motion planning involve the ability to perform motion planning at fast speeds, while possibly accounting for environmental change (e.g., changing location or orientation of obstacles in the environment). Challenges further include performing motion planning using relatively low cost equipment, at relative low energy consumption, and with limited amounts of storage (e.g., memory circuits, for instance on processor chip circuitry).

The operation of two or more robots in a multi-robot operation environment or shared workspace (workspaces are commonly referred to as workcells), present a particular class of problems. For example, motion plans should account for and avoid situations where the robots or robotic appendages of the robots may interfere with one another during the performance of tasks.

One approach to operating multiple robots in a common workspace can be called a task-level approach. An engineer may manually ensure that the robots are collision-free by defining portions of the workspace in which robots may collide with one another, denominated herein as interference regions, and programming the individual robots such that only one robot is in an interference region of the workspace at any given point in time. For example, when a first robot begins to move into an interference region of the workspace, the first robot sets a flag. A controller (e.g., programmed logic controller (PLC)) reads the flag and prevents other robots from moving into the interference region of the workspace until the first robot de-asserts the flag on exiting the interference region. This approach is intuitive, simple to understand, but typically difficult and time consuming to implement, and may not produce an optimized result. This approach necessarily has low work throughput since the use of task-level de-confliction usually leads to at least one of the robots being idle for significant portions of time, even if it would technically be possible for the idle robot to be performing useful work in the shared workspace.

In conventional approaches, a team of engineers typically divide the problem up, and optimize the smaller sub-problems (e.g., allocating tasks to robots, sequencing the tasks allocated to each robot, motion planning for each robot) independently of one another. This may employ iteratively simulating motion to ensure that the robots/robotic appendages do not collide with one another, which may take many hours of computation time, and may not result in an optimized solution. Additionally, if a modification to the workspace results in a change in a trajectory of one of the robots/robotic appendages, the entire workflow must be re-validated. Such approaches are of course not optimal, and typically require experts to go through the slow process of iteratively trying to find a combination of solutions that, when taken together produces a good result.

BRIEF SUMMARY

Various methods and apparatus are described herein that produce solutions for multi-robot configurations that are co-optimized across a set of non-homogenous parameters, for example co-optimized combinations of workcell layout and task plan, based on a given set of tasks to be performed by robots in a multi-robot operational environment. Such may be executed in an off-line or pre-runtime environment, providing a global optimizer for these types of problems. The inventors are not aware of any existing global optimizer solutions for such problems.

Input may include a model of a multi-robot operational environment, models of the robots, a limit on a total number of robots that can be employed, a set of tasks for the robots to achieve, and a limit on a total number of tasks that can be allocated to each robot (i.e., target capacity of robots). Inputs may also optionally include one or more dwell time durations for a robot or portion thereof to dwell at a target to, for example, complete a task (e.g., thread a bolt or a nut) or to avoid a collision. Inputs may also optionally include one or more of: a set of bounds or constraints on one or more parameters or variables, or a time limit that limits the time provided for modeling or simulating collisions.

The output may include a complete solution to the problem, which solution may have advantageously been optimized. In particular, the solution may have been optimized across a population of candidate solutions by an optimization engine that co-optimizes across a set of two or more non-homogenous parameters. The non-homogenous parameters may, for example, include two or more of: the respective base position and orientation of the robots, an allocation of the tasks to respective ones of the robots, and the respective target sequences for the robots. In the absence of any variability in timing, the output can be used to control the robots in the multi-robot environment without any modification. Alternatively, one or more motion planners can be employed during runtime to, for example, avoid collisions that might result due to small variabilities in timing (e.g., sometimes it may take a little more or a little less time to tighten a screw than other times).

The output may, for example, include: workcell layout, and for each robot: an ordered list or vector of targets (e.g., Robot$_1$: {target 7, target 2, pause, target 9}), optionally dwell time durations at respective targets, and paths or trajectories (e.g., collision-free paths or trajectories) between each pair of consecutive targets.

The workcell layout may provide a base position and orientation of a base for each robot, for example in Cartesian coordinates. The base position and orientation of each robot base specified with a respective 6-tuple {X, Y, Z, r, p, y}, where X, Y and Z respectively indicate a position along with respective axes of an orthogonal coordinate frame, and r (i.e., roll) indicates an amount of rotation about a first one of the axes, p (e.g., pitch) indicates an amount of rotation about a second one of the axes, and y (e.g., yaw) indicates an amount of rotation about a third one of the axes.

A global optimizer may, for example, be based on a multi-variable, mixed integer optimization algorithm, for example an algorithm known as Differential Evolution (DE). The claims are not limited to a DE algorithm unless the algorithm is expressly recited in the claims.

The global optimizer optimizes the robot base placement (in Cartesian coordinates), robot functional poses (i.e., in C-space) and per-robot task plans (ordered list of targets and pauses for the respective robot). The primary optimization goal may be latency (e.g., time to complete goal), but other goals can include efficient use of floor space, energy consumption or expenditure, number of movements to complete goal, ability to operate robots in parallel, minimizing wait time of robots, availability of a robot, status condition, and/or the availability of a robot suitable to carry out a specific type of task (for instance availability of a robot with a certain type of end-of-arm tool or end effector), etc. Thus, the structures and algorithms described herein facilitate the operation of two or more robots operating in a shared workspace or workcell, optimizing such placement and operation to at least some degree, and potentially preventing or at least reducing the risk that robots or robotic appendages of robots will collide with one another while operating to perform respective tasks in the shared workspace. The structures and algorithms described herein may advantageously reduce programming effort for multi-robot workspaces, by performing autonomous planning that has been optimized to at least some degree. Input may be limited to a description of the operational environment, the task(s) to be performed and geometric models of the robots. The structures and algorithms described herein may advantageously dynamically allocate tasks to be performed by the robots.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 7 shows a parameterized cost function which can be employed with an implementation that employs a Differential Evolution (DE) algorithm, according to at least one illustrated implementation.

FIG. 9 shows a data structure that may be employed by a processor-based system in representing a candidate solution in a format that allows perturbation, for example in executing the low level multi-robot optimization DE method of FIG. 6, according to at least one illustrated implementation.

DETAILED DESCRIPTION

Figure 1:
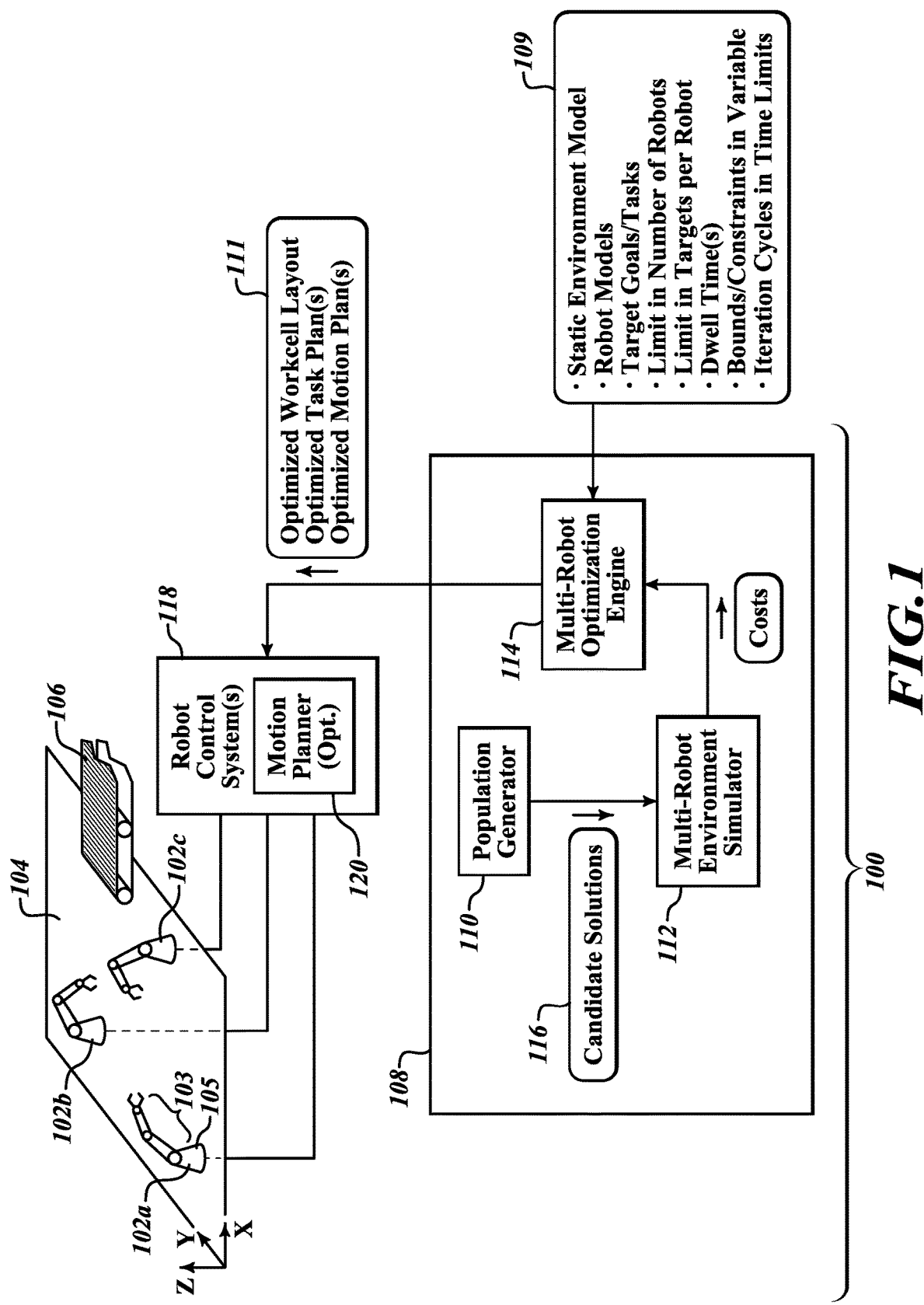
FIG. 1 is a schematic diagram of a shared workspace or multi-robot operational environment in which a plurality of robots operate to carry out tasks, and a configuration system performs an optimization to configure the robots, according to one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims, which follow, the word "comprise" and variations thereof, such as, "comprises" and "comprising" are to be construed in an open, inclusive sense that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms optimizing, optimize, and optimized mean that an improved result is being prepared, generated or produced, or has been prepared generated or produced. Such terms are used in their relative sense, and do not mean that an absolutely optimum value has been prepared, generated or produced.

As used in this specification and the appended claims, the terms "workspace" or "shared workspace" are used to refer to a current operational environment in which two or more robots operate, one or more portions of the shared workspace are volumes in which robots can potentially collide with one another, hence may be denominated as interference regions. The operational environment may include obstacles and/or work pieces (i.e., items with which the robots are to interact or act on or act with).

As used in this specification and the appended claims, the term "task" is used to refer to a robotic task in which a robot transitions from a pose A to a pose B without colliding with obstacles in its environment. The task may perhaps involve the grasping or un-grasping of an item, moving or dropping an item, rotating an item, or retrieving or placing an item. The transition from pose A to pose B may optionally include transitioning between one or more intermediary poses.

The headings and Abstract of the Disclosure provided herein are for convenience only and do not interpret the scope or meaning of the embodiments.

FIG. 1 shows a robotic system 100 which includes a plurality of robots 102a, 102b, 102c (collectively 102) that operate in a shared workspace 104 to carry out tasks, according to one illustrated implementation.

The robots 102 can take any of a large variety of forms. Typically, the robots 102 will take the form of, or have, one or more robotic appendages 103 (only one called out) and a base 105 (only one called out). The robots 102 may include one or more linkages with one or more joints, and actuators (e.g., electric motors, stepper motors, solenoids, pneumatic actuators or hydraulic actuators) coupled and operable to move the linkages in response to control or drive signals. Pneumatic actuators may, for example, include one or more pistons, cylinders, valves, reservoirs of gas, and/or pressure sources (e.g., compressor, blower). Hydraulic actuators may, for example, include one or more pistons, cylinders, valves, reservoirs of fluid (e.g., low compressibility hydraulic fluid), and/or pressure sources (e.g., compressor, blower). The robotic system 100 may employ other forms of robots 102, for example autonomous vehicles.

The shared workspace 104 typically represents a three-dimensional space in which the robots 102 may operate and move, although in certain limited implementations the shared workspace 104 may represent a two-dimensional space. The shared workspace 104 is a volume or area in which at least portions of the robots 102 may overlap in space and time or otherwise collide if motion is not controlled to avoid collision. It is noted that the workspace 104 is a physical space or volume, a position and orientation in which physical space or volume may be conveniently represented via, for example, Cartesian coordinates with respect to some reference frame, for instance a reference frame represented by the orthogonal axes X, Y and Z illustrated in FIG. 1. It is also noted that the reference frame of the workspace 104 is different than a respective "configuration space" or "C-space" of any of the robots 102 the C-space typically represented by a set of joint positions, orientations or configurations in a respective reference frame of any of the robots 102.

As explained herein, a robot 102a or portion thereof may constitute an obstacle when considered from a viewpoint of another robot 102b (i.e., when motion planning for another robot 102b). The shared workspace 104 may additionally include other obstacles, for example pieces of machinery (e.g., conveyor 106), posts, pillars, walls, ceiling, floor, tables, humans, and/or animals. The shared workspace 104 may additionally include one or more work items or work pieces which the robots 102 manipulate as part of performing tasks, for example one or more parcels, packaging, fasteners, tools, items or other objects.

The robotic system 100 includes one or more processor-based multi-robot configuration optimization systems 108 (one shown in FIG. 1). The multi-robot configuration optimization system(s) 108 receives a set of input 109 and generates as output 111 one or more solutions that specify a configuration of the robots 102, including a respective base position and orientation, a respective set of at least one defined pose, and a respective target sequence for each of the robots 102, which may be optimized to at least some degree.

The multi-robot configuration optimization system(s) 108 may include a population generator 110, a multi-robot environment simulator 112, and a multi-robot optimization engine 114.

The population generator 110 generates a set of candidate solutions 116 based on provided input 109. The candidate solutions 116 represent possible solutions to a configuration problem, that is how to configure the robots 102 in the workspace 104 to accomplish a set of tasks. Any given candidate solution 116 may or may not actually be viable. That is, an initial candidate may be invalid (e.g., robot in impossible place, have an infeasible task plan where there is an unreachable target, or would result in collisions). In some implementations, the population generator may try to find better candidate solutions.

The multi-robot environment simulator 112 models the multi-robot environment based on each candidate solution, to determine certain attributes, for example an amount of time required to complete the tasks, a probability or rate of collision in completing the tasks, the feasibility or infeasibility of a particular configuration as specified by the candidate solution. The multi-robot environment simulator 112 may reflect such in terms of cost, the cost generated via one or more cost functions.

The multi-robot optimization engine 114 evaluates candidate solutions based at least in part on associated costs 118, and advantageously co-optimizes across a set of two or more non-homogenous parameters, for example across two or more of: the respective base position and orientation of the robots, an allocation of the tasks to respective ones of the robots, the respective target sequences for the robots, and/or respective trajectories or paths (e.g., collision-free paths) between successive targets. Straight-line trajectories between consecutive targets are used to ease explanation, but the trajectories do not need to be straight-line trajectories.

The input 109 may include one or more static environment models that represent or characterize the operational environment or workspace 104, for example representing a floor, walls, ceiling, pillars, other obstacles, etc. The operational environment or workspace 104 may be represented by one or more models, for example a geometric model (e.g., point cloud) that represents a floor, walls, ceiling, obstacles and other objects in the operational environment. Such may, for example, be represent in Cartesian coordinates.

The input 109 may include one or more robot models that represent or characterize each of the robots 102, for example specifying geometry and kinematics, for instance sizes or lengths, number of links, number of joints, joint types ranges of motion, limits on speed, limits on acceleration or jerk. The robots 102 may be represented by one or more robot geometric models that define a geometry of a given robot 102a-102c, for example in terms of joints, degrees of freedom, dimensions (e.g., length of linkages), and/or in terms of the respective C-space of the robot 102a-102c.

The input 109 may include one or more sets of tasks to be performed, for example represented as target goals (e.g., positions or configurations). The task may, for example, be represented in terms of end poses, end configurations or end states, and/or intermediate poses, intermediate configurations or intermediate states of the respective robot 102a-102c. Poses, configurations or states may, for example, be defined in terms of joint positions and joint angles/rotations (e.g., joint poses, joint coordinates) of the respective robot 102a-102c. The input 109 may optionally include one or more dwell time durations which specify an amount of time a robot or portion thereof should dwell at a given target in order to complete a task (e.g., tighten a screw or nut, picking and placing objects, with the goal of sorting a pile of objects into two or more distinct piles of objects of respective types of objects by two or more robots operating in a common workspace).

The input 109 may optionally include a limit on the number of robots that can be configured in the workspace 104. The input 109 may optionally include a limit on the number of tasks or targets that can be allocated to a given robot 102a-102c, denominated herein a task capacity, that can be configured in the workspace 104, for example limiting the complexity of the configuration problem to ensure that the configuration problem is solvable or solvable within some acceptable time period using available computational resources, or pre-eliminating certain solutions which are presumed to be too slow given an apparent over-allocation of tasks or targets to a given robot 102a-102c. The input 109 may optionally include one or more bounds or constraints on variables or other parameters. The input 109 may optionally include a total number of iteration cycles or time limit on iterations which may be used in refining candidate solutions, for example, to ensure that the configuration problem is solvable or solvable within some acceptable time period using available computational resources.

The robotic system 100 may optionally include one or more robot control systems 118 (only one shown in FIG. 1) communicatively coupled to control the robots 102. The robot control system(s) 118 may, for example, provide control signals (e.g., drive signals) to various actuators to cause the robots 102 to move between various configurations to various specified targets in order to perform specified tasks.

The robotic system 100 may optionally include one or more motion planners 120 (only one shown in FIG. 1) communicatively coupled to control the robots 102. The motion planner(s) 120 produce or refine motion plans for the robots 102, for instance to account for small deviations in time with respect to motion plans provided by the multi-robot optimization engine 114, or to account for the unexpected appearance of obstacles (e.g., human entering the operational environment or workspace 104), as described elsewhere herein. The optional motion planners 120 are operable to dynamically produce motion plans to cause the robots 102 to carry out tasks in an operational environment. The motion planners 120, as well as other structures and/or operations, may employ those described in U.S. patent application Ser. No. 62/865,431, filed Jun. 24, 2019.

Where included, the motion planners 120 are optionally communicatively coupled to receive as input perception data, for example provided by a perception subsystem (not shown). The perception data is representative of static and/or dynamic objects in the workspace 104 that are not known a priori. The perception data may be raw data as sensed via one or more sensors (e.g., cameras, stereo cameras, time-of-flight cameras, LIDAR) and/or as converted to digital representations of obstacles by the perception subsystem, which may generate a respective discretization of a representation of an environment in which the robots 102 will operate to execute tasks for various different scenarios.

Various communicative paths are illustrated in FIG. 1 as lines between various structures, in some cases arrows indicating the direction of input 109 and output 111. The communicative paths may for example take the form of one or more wired communications paths (e.g., electrical conductors, signal buses, or optical fiber) and/or one or more wireless communications paths (e.g., via RF or microwave radios and antennas, infrared transceivers). Communications channels may include, for example, one or more transmitters, receivers, transceivers, radios, routers, wired ports, for instance Ethernet ports, etc.

Figure 2:
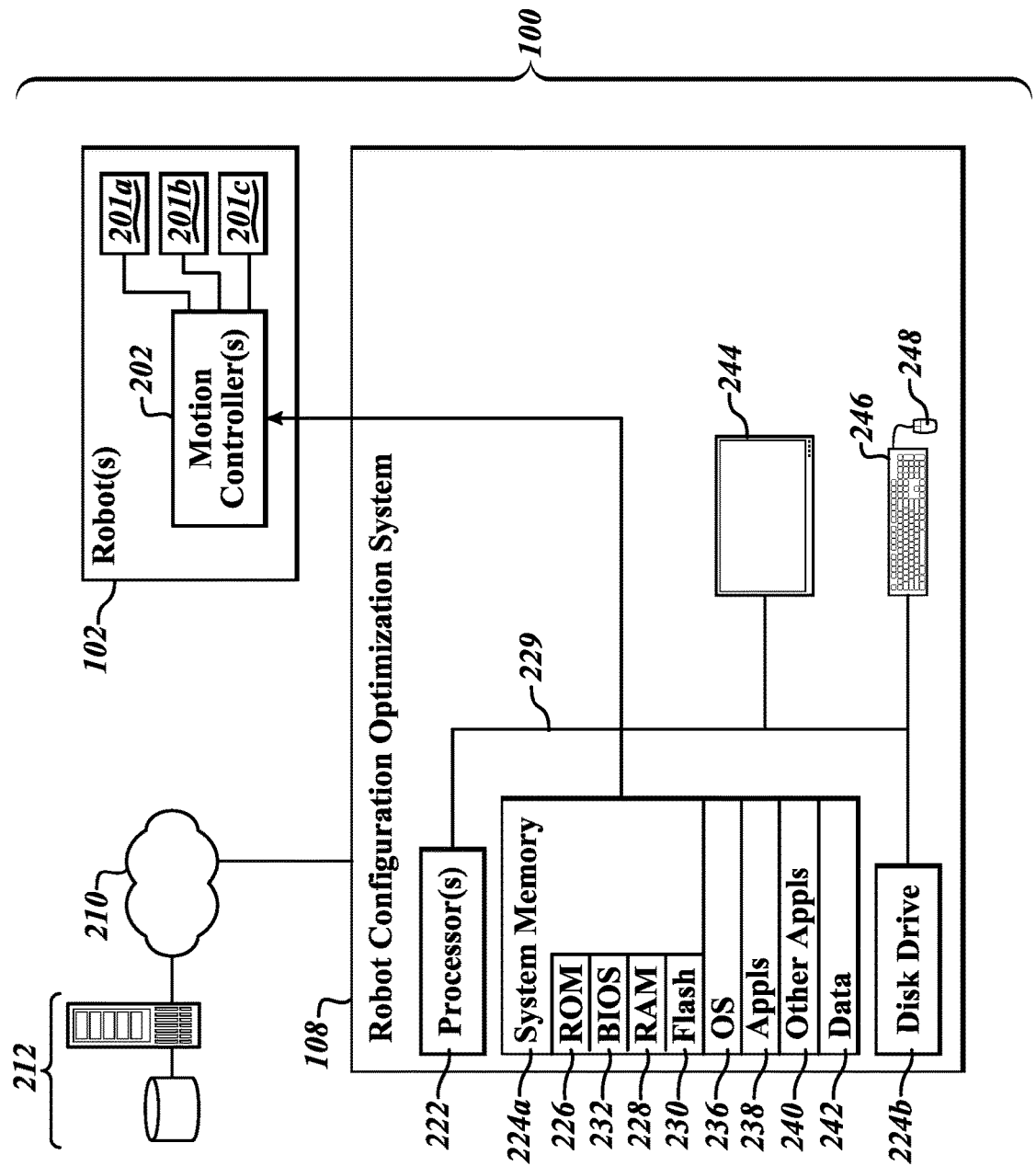
FIG. 2 is a functional block diagram of the configuration system of FIG. 1 that include one or more processors and one or more non-transitory processor-readable media that stores processor-executable instructions, and that also shows a plurality of robots, according to one illustrated implementation.

FIG. 2 shows a functional block representation of the robotic system 100 of FIG. 1 according to at least one illustrated implementation.

The robotic system 100 may include a robot configuration optimization system 108 and robots 102. The optimization system 108 may be communicatively coupled to control the robots 102, either directly or indirectly via an intervening robot control system 118 (FIG. 1).

Each robot 102a-102c may include a set of links, joints, end-of-arm tools or end effectors, and/or actuators 201a, 201b, 201c (three, shown, collectively 201) operable to move the links about the joints. Each robot 102a-102c may include one or more motion controllers (e.g., motor controllers) 202 (only one shown) that receive control signals, for instance from the robot configuration optimization system 108, and that provide drive signals to drive the actuators 201. The motion controllers 202 may be dedicated to controlling specific ones of the actuators 201.

A robot configuration optimization system 108 will be described in detail for illustrative purposes. Those of skill in the art will recognize that the description is exemplary and variations may be made to the described and illustrated robot configuration optimization system 108.

The robot configuration optimization system 108 may comprise one or more processor(s) 222, and one or more associated non-transitory computer or processor-readable storage media, for example system memory 224a, disk drives 224b, and/or memory or registers (not shown) of the processors 222. The non-transitory computer- or processor-readable storage media 224a, 224b are communicatively coupled to the processor(s) 222a via one or more communications channels, such as system bus 229. The system bus 229 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot configuration optimization system 108 may also be communicably coupled to one or more remote computer systems 212, e.g., server computer, desktop computer, laptop computer, ultraportable computer, tablet computer, smartphone, wearable computer and/or sensors (not illustrated in FIG. 2), that are directly communicably coupled or indirectly communicably coupled to the various components of the robot configuration optimization system 108, for example via a network interface (not shown). Remote computing systems (e.g., server computer (e.g., source of input 212)) may be used to program, configure, control or otherwise interface with or provide input data (e.g., environment models, robot models, tasks, target goals, limits on total number of robots, limit on tasks per robot, bounds or constraints on variables or other parameters, limits on iterations) to the robot configuration optimization system 108 and various components within the robot system 100. Such a connection may be through one or more communications channels, for example, one or more wide-area networks (WANs), for instance, Ethernet, or the Internet, using Internet protocols. In some implementations, pre-runtime calculations (e.g., generation of the output) may be performed by a system that is separate from the robots 102, while runtime calculations may be performed by one or more optional intervening motion planners 120 (FIG. 1), which in some implementation may be on-board the robots 102a-102c.

As noted, the robot configuration optimization system 108 may include one or more processor(s) 222, (i.e., circuitry), non-transitory storage media 224a, 224b, and system bus 229 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structure shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; and/or U.S. patent application Ser. No. 62/865,431, filed Jun. 24, 2019, entitled "MOTION PLANNING FOR MULTIPLE ROBOTS IN SHARED WORKSPACE".

The system memory 224a may include read-only memory ("ROM") 226, random access memory ("RAM") 228, FLASH memory 230, EEPROM (not shown). A basic input/output system ("BIOS") 232, which can form part of the ROM 226, contains basic routines that help transfer information between elements within the robotic system 100, such as during start-up.

The drive 224b may be, for example, a hard disk drive for reading from and writing to a magnetic disk, a solid state (e.g., flash memory) drive for reading from and writing to solid state memory, and/or an optical disk drive for reading from and writing to removable optical disks. The robot configuration optimization system 108 may also include any combination of such drives in various different embodiments. The drive 224b may communicate with the processor(s) 222 via the system bus 229. The drive(s) 224b may include interfaces or controllers (not shown) coupled between such drives and the system bus 229, as is known by those skilled in the relevant art. The drive 224b and its associated computer-readable media provide nonvolatile storage of computer- or processor readable and/or executable instructions, data structures, program modules and other data for the robotic system 100. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224a, for example an operating system 236, one or more application programs 238, other programs or modules 240 and program data 242. Application programs 238 may include processor-executable instructions that cause the processor(s) 222 to perform one or more of: generating populations of candidate solutions, modeling candidate solutions, producing or determining costs associated with respective candidate solutions based at least in part on the modeling, performing an optimization on the population of C candidate solutions by an optimization engine that co-optimizes across a set of two or more non-homogenous parameters for two or more of: the respective base position and orientation of the robots, an allocation of the tasks to respective ones of the robots, and the respective target sequences for the robots; and/or providing output that can be used to position and orient robots in a multi-robot operational environment and cause the robots to perform tasks. Such operation can be executed as described herein (e.g., with reference to FIGS. 3 and 10) and in the references incorporated herein by reference. The processor-executable instructions cause the processor(s) 222, in at least some implementations, to construct motion plans (e.g., collision detection or assessment, update costs of edges in motion planning graphs based on collision detection or assessment, and perform path search or evaluation). Application programs 238 may additionally include one or more machine-readable and machine-executable instructions that cause the processor(s) 222 to perform other operations, for instance optionally handling perception data (captured via sensors). Application programs 238 may additionally include one or more machine-executable instructions that cause the processor(s) 222 to perform various other methods described herein and in the references incorporated herein by reference.

While shown in FIG. 2 as being stored in the system memory 224a, the operating system 236, application programs 238, other applications, programs/modules 240, and program data 242 can be stored on other non-transitory computer- or processor-readable media, for example drive(s) 224b.

Although not required, many of the implementations will be described in the general context of computer-executable instructions, such as program application modules, objects, or macros stored on computer- or processor-readable media and executed by one or more computer or processors that can perform candidate solution generation, modeling of candidate solutions for instance via forward kinematics, detection of collisions in the models, determination of time to perform and other costs, cost generation via a costing function, co-optimization across a set of non-homogeneous parameters, generation of trajectories or paths (e.g., collision-free paths), and/or other motion planning operations.

In various implementations, operations may be performed entirely in hardware circuitry or as software stored in a memory storage, such as system memory 224a, and executed by one or more hardware processors 222a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

The robot configuration optimization system 108 may optional include one or more input/output components, for example a monitor or touchscreen display 244, a keypad or keyboard 246, and/or pointing device such as a computer mouse 248.

Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve robot configuration.

Figure 3:
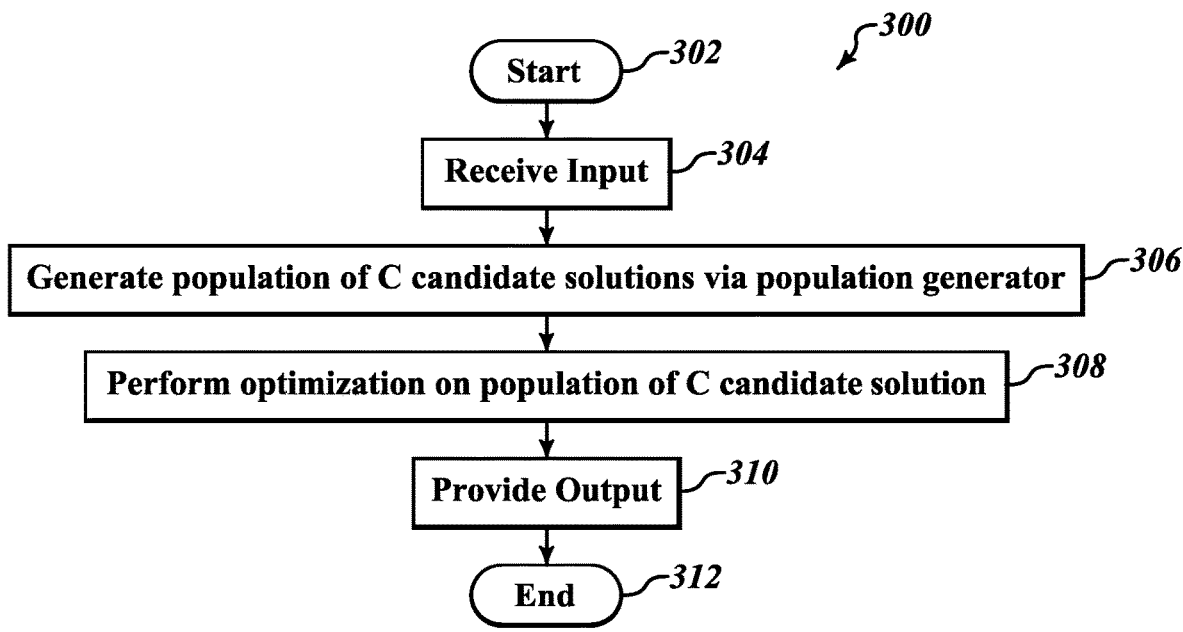
FIG. 3 shows a high-level robot configuration method of operation of a processor-based system to configure a plurality of robots for a multi-robot operational environment in which a plurality of robots will operate, according to at least one illustrated implementation.

FIG. 3 shows a high-level robot configuration method 300 of operation of a processor-based system to configure a plurality of robots for a multi-robot operational environment in which a plurality of robots will operate, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the robot configuration method 300.

A number of robots may be configured to perform a set of tasks. The tasks may be specified as a task plan. The task plan may specify a number T tasks that need to be performed by a number R robots. A task plan can be modeled as a vector per robot, where the vector is an ordered list of the tasks the respective robot is to perform, e.g., {task 7, task 2, task 9}. A task vector can also optionally include dwell time durations that specify a time duration that the robot or portion thereof should dwell at a given configuration or target. The task vector may also specify a home pose and/or other "functional poses" that are not directly related to solving tasks (e.g., a "get out of the way" or storage pose). Poses may be specified in the C-space of the robot.

The robot configuration method 300 may start at 302, for example in response to a startup or powering of the system or component thereof, receipt of information or data, or a call or invocation by a calling routine or program. The robot configuration method 300 may be performed at a configuration time or pre-runtime, which can occur before runtime. This advantageously permits some of the most computationally intensive work to be performed before runtime, when responsiveness is not a particular concern.

At 304, at least one component of the processor-based system receives input that characterizes a multi-robot environment, a set of tasks to be performed and provides various constraints or boundaries for the problem.

For example, the processor-based system may receive one or models of the multi-robot operational environment. The model(s) may represent the physical environment in which the plurality of robots will operate, for example representing a floor, walls, and various objects in the environment.

Also for example, the processor-based system may receive a respective model of each of the plurality of robots that will operate in the multi-robot operational environment. The robot models may represent the physical attributes of the robot, for example physical dimensions, range of motion, number of joints, number of links, length of links, type of end effector, speed limits, acceleration limits, etc.

Also for example, the processor-based system may receive a set of tasks or targets. The targets may represent various positions to which each robot or portion thereof must move in sequence or at certain times in order to complete a set of tasks. The targets may, for example, be represented in the configuration space (C-space) of the respective robots. Also for example, the processor-based system may optionally receive one or more dwell time durations to dwell at one or more targets while at least one of the robots performs at least one task. The dwell time durations may advantageously reflect an expected amount of time that an end effector of a robot needs to remain at a given target in order to complete a respective task (e.g., thread a fastener into a threaded opening, insert a piece into a receptacle).

Also for example, the processor-based system may optionally receive a set of bounds or constraints on variables. Various bounds and constraints may be applicable to optimization in the multi-robot environment, For example, the processor-based system may optionally receive a set of time intervals that specifies a time limit on modeling movements or simulating collisions. For example, the processor-based system may optionally receive a limit on a total number of robots allowed to operate in the multi-robot operational environment. For example, the processor-based system may optionally receive a maximum number of tasks or targets allowed per robot which again may prevent a problem from being submitted that is too complicated to solve given the available computational resources or time.

At 306, a population generator generates a population of C candidate solutions. The population can include one or more candidate solutions. Each of the candidate solutions in the population of C candidate solutions specifies, for each of the robots: a respective base position and orientation, a respective set of at least one defined pose, and a respective target sequence. The respective base position and orientation specify a respective position and orientation for a base of the respective robot in the multi-robot operational environment. The respective set of at least one defined pose specifies at least a respective home pose of the respective robot in the multi-robot operational environment, and/or other functional poses (e.g., a get out of the way or storage pose). The respective target sequence comprises a respective ordered list of targets for the respective robot to move through to complete a respective sequence of tasks. The population generator may be implemented as one or more processors executing processor-executable instructions.

The population generator may take the form of a pseudo-random population generator which may pseudo-randomly generate the population of C candidate solutions based on one or more input parameters. A pseudo-random population generator generates candidate solutions which may or may not be actually viable solutions. The population generator alternatively generates the population of C candidate solutions each having a lower probability of being an invalid candidate solution than a purely pseudo-randomly generated population of C candidate solutions. Such may produce populations of candidate solutions that lead to faster optimization without loss of configuration space cover. For example, the population generator may take into account the operational environment to avoid candidate solutions that would locate a base of a robot at a position that is impossible (e.g., occupied by a wall or other object), would result in an infeasible task plan with one or more targets that are unreachable by the robot, or would result in collisions. Where a pseudo-random population generator is used, a number of techniques may be employed to improve the candidate solutions, for example techniques described below with reference to FIG. 6.

At 308, an optimization engine performs an optimization on the population of C candidate solutions. In particular, the optimization engine co-optimizes across a set of two or more non-homogenous parameters for two or more of: the respective base position and orientation of the robots, an allocation of the tasks to respective ones of the robots, and the respective target sequences for the robots. The optimization engine may, for example, select an optimized candidate solution with a co-optimized combination of: a respective optimized base position and orientation for the respective base of each of the robots, an optimized task allocation, and an optimized motion plan. The optimization engine may be implemented as one or more processors executing processor-executable instructions. As described below with reference to FIG. 4, the optimization engine may interact with a multi-robot environment simulator in preforming the optimization, for example providing candidate solutions to be simulated and receiving costs generated or determined by a multi-robot environment simulator which characterize the efficiency (e.g., time to completion) and the probability or rate of collision of the respective candidate solution. The optimization engine may select one of the candidate solutions based at least in part on a respective cost associated with the candidate solution, the respective cost based at least in part on the time to complete the sequences of tasks and the collision value determined for the respective candidate solution.

At 310, the optimization engine provides output from the optimization. In particular, the optimization engine may provide as output one or more of: the respective base position and orientation for each of the robots, a respective task allocation for each of the robots, a respective motion plan for each of the robots, and/or a set of collision-free paths for each of the robots with or without dwell durations at respective targets in the C-space of the robot. The output may include an optimized task allocation that specifies, for each robot, a respective sequence of tasks to be performed in the form of an optimized ordered list of targets in C-space of the respective robot and one or more dwell time durations at one or more of the targets. The output may additionally or alternatively include an optimized motion plan that specifies a set of collision-free paths, the set of collision-free paths specifying a respective collision-free path between each pair of consecutive targets in the ordered list of targets. In at least some implementations, the output is sufficient to drive the robots to perform a set of tasks. In at least some implementations, a motion planner may be employed to refine the motion plan.

The high level robot configuration method 300 may terminate at 312, for example until invoked again. While the high level robot configuration method 300 is described in terms of an ordered flow, the various acts or operations will in many implementations be performed concurrently or in parallel.

Figure 4:
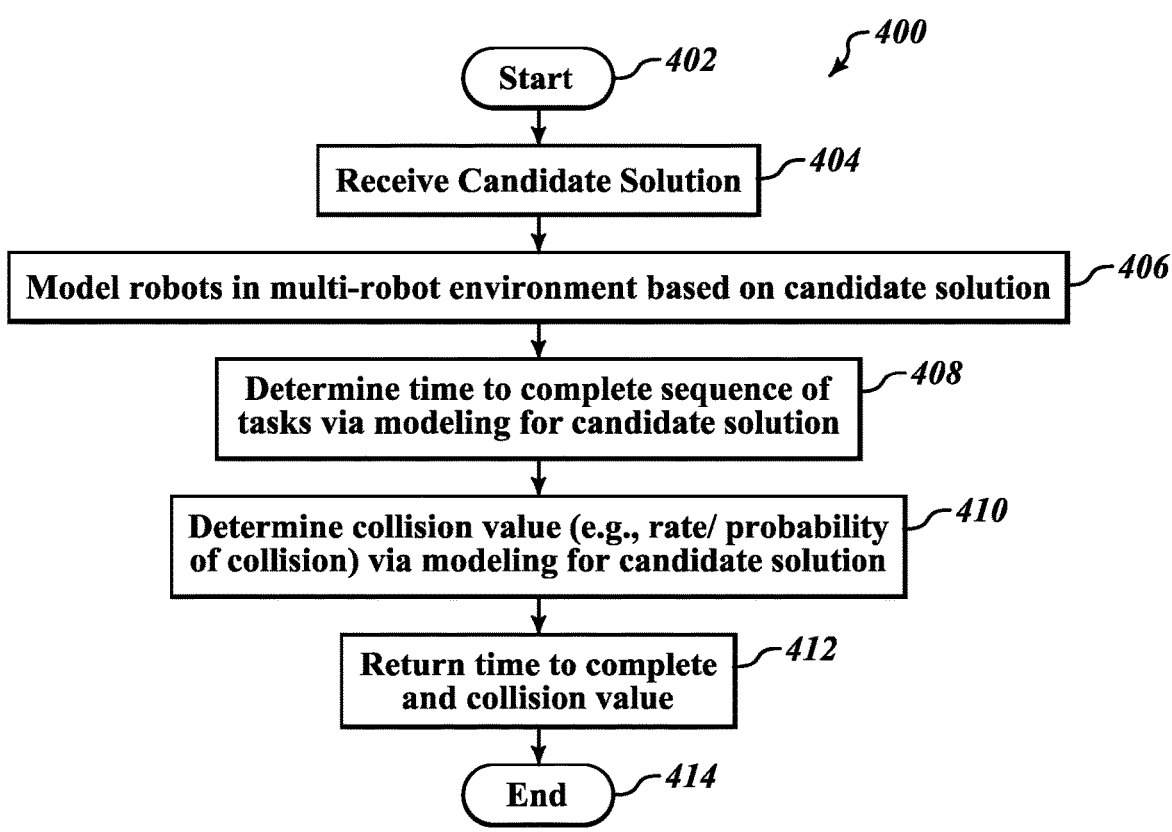
FIG. 4 shows a high-level multi-robot environment simulation method of operation of a processor-based system to configure a plurality of robots for a multi-robot operational environment in which a plurality of robots will operate, according to at least one illustrated implementation.

FIG. 4 shows a high level multi-robot environment simulation method 400 of operation of a processor-based system to configure a plurality of robots for a multi-robot operational environment in which a plurality of robots will operate, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the multi-robot environment simulation method 400. The multi-robot environment simulation method 400 may be executed by a multi-robot environment simulator, which may be implemented by a distinct processor or processors, which is or are dedicated to the simulation of movements in a multi-robot environment. Alternatively, the multi-robot environment simulator may be implemented by one or more processors which perform other operations, for example which perform optimization.

The multi-robot environment simulation method 400 may start at 402, for example in response to a startup or powering of the system, receipt of information or data, or a call or invocation by a calling routine or program (e.g., invocation by high level robot configuration method 300).

At 404, a multi-robot environment simulator receives a candidate solution, for example from an optimization engine or a population generator.

At 406, a multi-robot environment simulator models the robots in the multi-robot environment based on a particular candidate solution. The candidate solution may, for example, be submitted or provided to the multi-robot environment simulator by the optimization engine. Conventional modeling packages can be employed, for example modeling packages that employ forward kinematics to model the movements of the robots based on the candidate solution.

At 408, the multi-robot environment simulator determines a respective time to complete the sequence of tasks via modeling performed by the multi-robot environment simulator. The determination may include determining the overall time to complete the sequence of tasks by all of the robots, which may have to wait for one another. Such may, for example, include determining the respective times to complete the respective tasks for each of the robots.

At 410, the multi-robot environment simulator determines a collision value that represents a rate or a probability of a collision occurring in completing the sequence of tasks via modeling performed by the multi-robot environment simulator. The determination may include determining the overall collision value for a completion of the sequence of tasks by all of the robots. Such may, for example, include determining the respective collision value for each of the robots.

At 412, the multi-robot environment simulator provides the determined time to complete the sequence of tasks and the determined collision value to, for example, the optimization engine. In some implementations, the multi-robot environment simulator provides the determined time and collision values as distinct values, for processing by the optimization engine to form a value that can be co-optimized across two or more non-homogenous parameters, as described elsewhere herein.

The multi-robot environment simulation method 400 may terminate at 414, for example until invoked again. While the multi-robot environment simulation method 400 is described in terms of an ordered flow, the various acts or operations will in many implementations be performed concurrently or in parallel.

Figure 5:
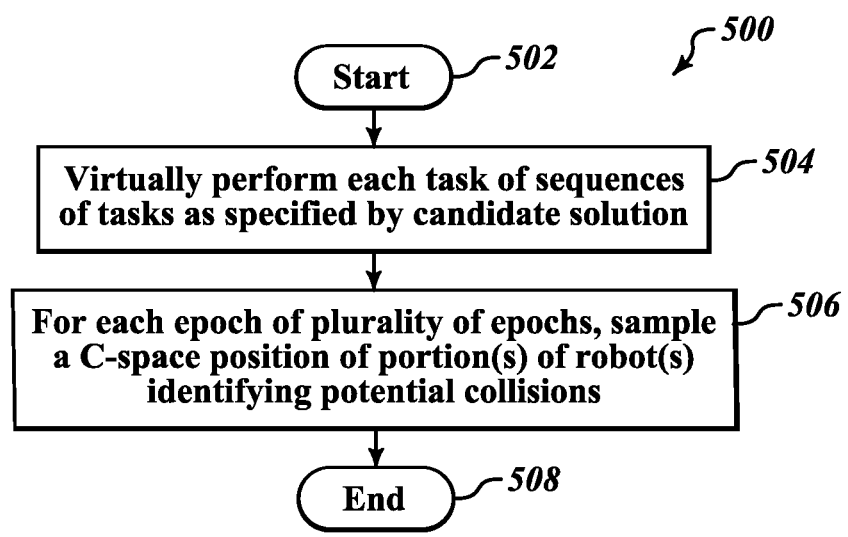
FIG. 5 shows a low-level multi-robot environment simulation method of operation of a processor-based system to configure a plurality of robots for a multi-robot operational environment in which a plurality of robots will operate, according to at least one illustrated implementation.

FIG. 5 shows a low-level multi-robot environment simulation method 500 of operation of a processor-based system to configure a plurality of robots for a multi-robot operational environment in which a plurality of robots will operate, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the multi-robot environment simulation method 500. The multi-robot environment simulation method 500 may be executed by a multi-robot environment simulator, which may be implemented by a distinct processor or processors, which is or are dedicated to the simulation of movements in a multi-robot environment. Alternatively, the multi-robot environment simulator may be implemented by one or more processors which perform other operations, for example which perform optimization.

The multi-robot environment simulation method 500 may start at 502, for example in response to a startup or powering of the system, receipt of information or data, or a call or invocation by a calling routine or program (e.g., invocation by high level robot configuration method 300).

At 504, a multi-robot environment simulator virtually performs each task in each robot's sequence of tasks as specified by a candidate solution that is a subject of evaluation or consideration. The sequences of tasks may be specified as respective ordered lists of tasks. The ordered lists of tasks are each equivalent to an ordered list of trajectories in the C-space of the robot. The ordered lists of tasks may include a plurality of trajectories between successive poses or configurations (e.g., joint configurations), one or more dwell time durations at one or more poses, a home pose, and one or more other defined functional poses in the C-space of the robot, for example a stowed or "get out of the way" pose. To virtually perform each task, the processor-executable instructions, when executed by the at least one processor, cause the processor to virtually simulate the plurality of trajectories and one or more of: one or more dwell time durations at one or more poses, the home pose, or the one or more other defined functional poses.

At 506, for each epoch (e.g., 0.1 s or some chosen input value) of a plurality of epochs, the multi-robot environment simulator samples a C-space position of a portion of at least one of the robots. The multi-robot environment simulator uses forward kinematics to identify potential collisions between one or more portions of a respective one of the robots and another portion of the respective one of the robots, between the respective one of the robots and another one of the robots in the environment, and between the respective one of the robots and another object in the multi-robot operational environment that is not another robot.

The multi-robot environment simulation method 500 may terminate at 508, for example until invoked again. While the low-level multi-robot environment simulation method 500 is described in terms of an ordered flow, the various acts or operations will in many implementations be performed concurrently or in parallel.

The described systems and methods may employ various approaches to refine or improve the candidate solutions. For example, some approaches may start with a base solution, and improve on the base solution. Also for example some approaches may employ a genetic algorithm or approach, for example a Differential Evolution (DE) algorithm or similar techniques. A version of a DE algorithm is described with reference to FIG. 6 below.

Figure 6:
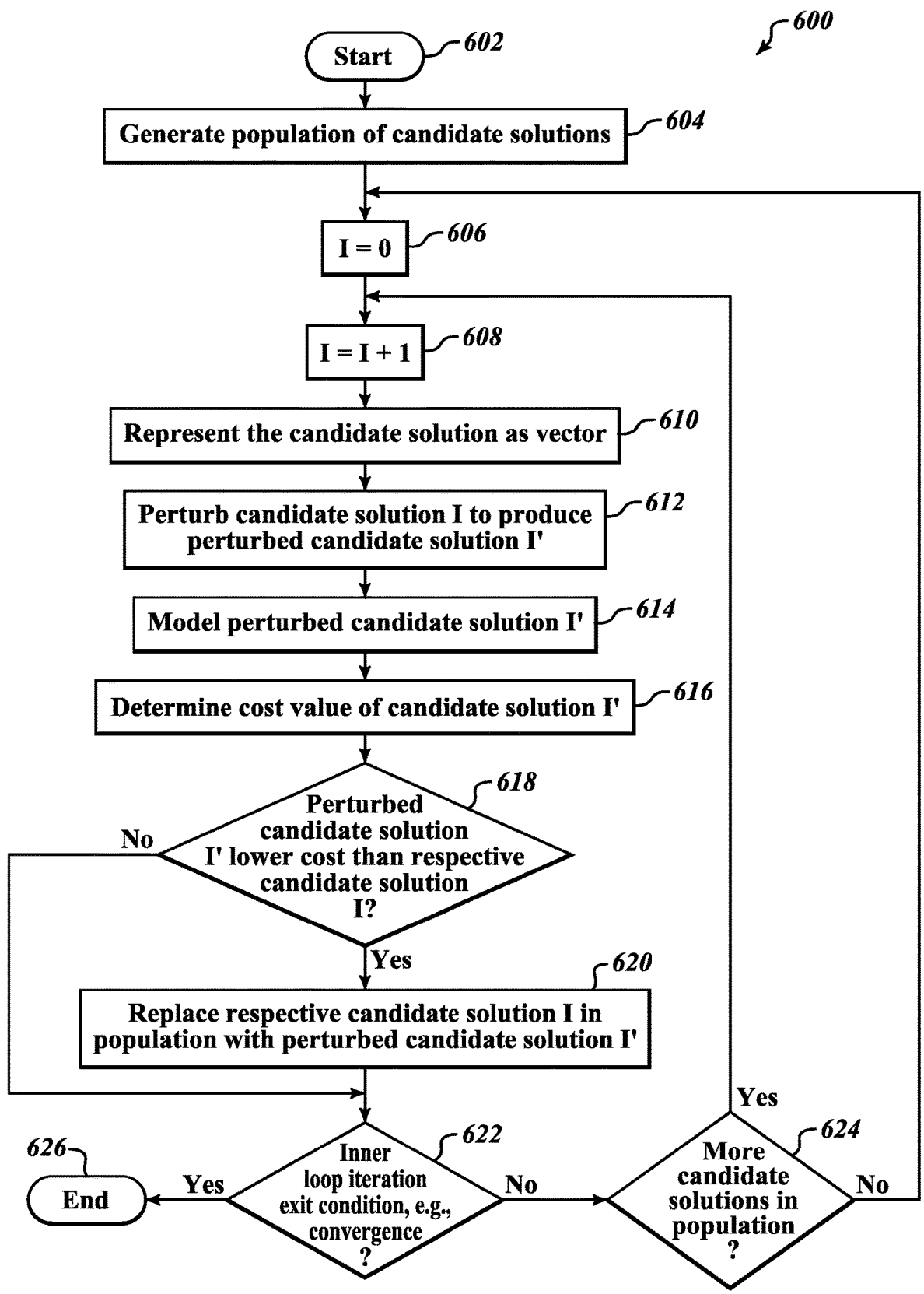
FIG. 6 shows a low-level multi-robot optimization DE method of operation of a processor-based system to configure a plurality of robots for a multi-robot operational environment in which a plurality of robots will operate, according to at least one illustrated implementation.

FIG. 6 shows a low-level multi-robot optimization DE method 600 of operation of a processor-based system to configure a plurality of robots for a multi-robot operational environment in which a plurality of robots will operate, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the multi-robot optimization method 600. The multi-robot optimization method 600 may be executed by an optimization engine, which may be implemented by a distinct processor or processors, which is or are dedicated to the optimization engine of the multi-robot environment. Alternatively, the multi-robot environment simulator may be implemented by one or more processors, which perform other operations.

The multi-robot environment simulation method 600 may start at 602, for example in response to a startup or powering of the system, receipt of information or data, or a call or invocation by a calling routine or program (e.g., invocation by high level robot configuration method 300).

At 604, the population generator generates a population of candidate solutions.

At 606, an outer loop counter I is initialized, for example to zero. At 608, the outer loop counter I is incremented, for example as I plus one.

At 610, represent the candidate solution in a format that allows perturbation. For example, the candidate solution may be represented as a candidate solution vector. The candidate solution vector may, for example, include a plurality of real number vector elements, for instance one real number vector element for each task. The real number vector elements may represent a respective combination of a respective one of the tasks, a priority for the respective one of the tasks, and one of the robots identified to perform the respective one of the tasks.

At 612, the optimizer engine perturbs a candidate solution I or causes the candidate solution I to be perturbed, to produce a perturbed candidate solution I'. For example, the optimizer engine may modify the real number vector elements (i.e., real number values) of the candidate solution vector.

At 614, a multi-robot environment simulator models the perturbed candidate solution I', for example determining a time to complete the sequence of tasks for the perturbed candidate solution I' and a collision value that represents a rate or a probability of a collision occurring in completing the sequence of tasks for the perturbed candidate solution I'.

Figure 8:
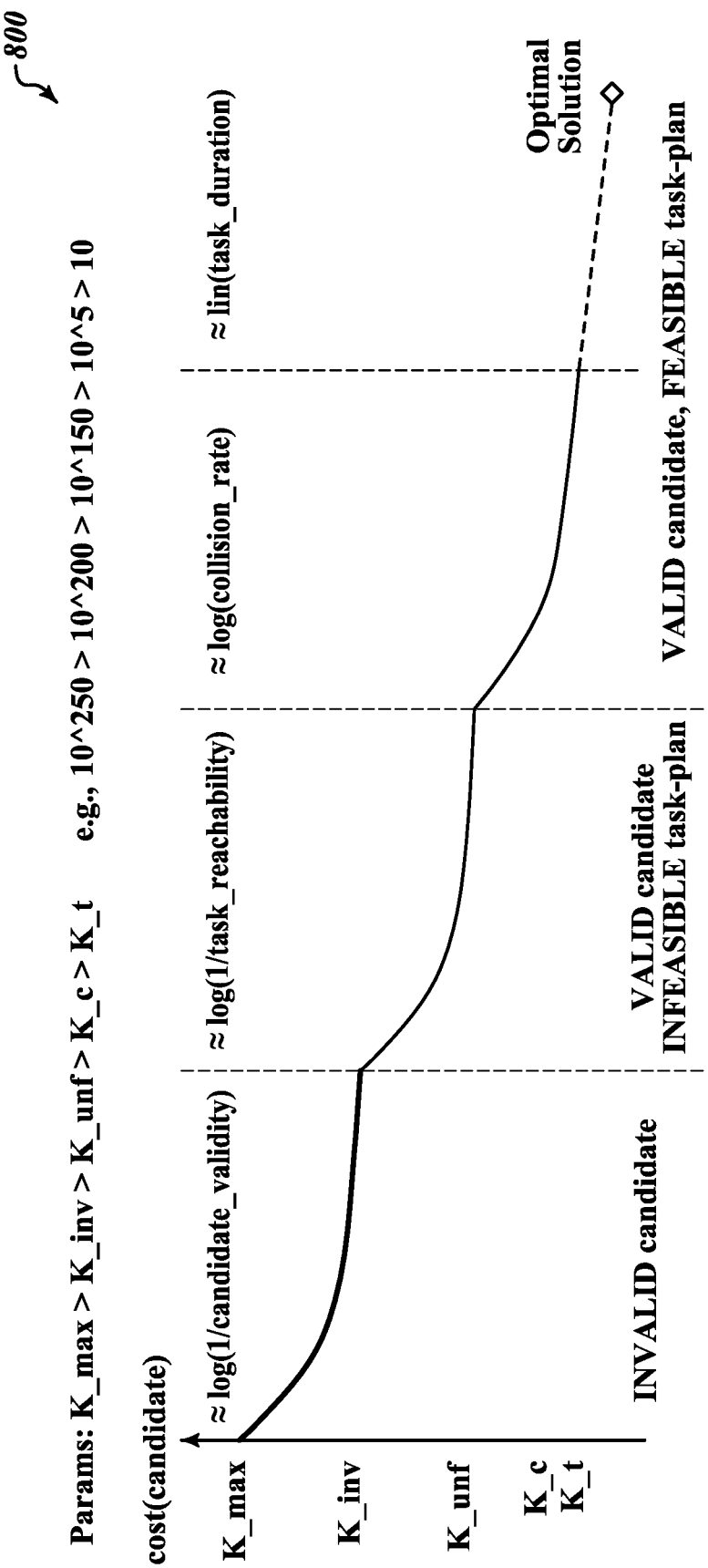
FIG. 8 is a graph further illustrating the cost function of FIG. 7, according to at least one illustrated implementation.

At 616, the optimization engine or the multi-robot environment simulator determines a cost value for the perturbed candidate solution I'. The determine cost value may be a function of the determined time to complete the sequence of tasks for the perturbed candidate solution I' and the determined collision value for the perturbed candidate solution I'. In DE, the cost function is a piece-wise logarithmic function, but can be parameterized, for example as represented by the parameterization 700 in FIG. 7 and the graph 800 in FIG. 8. In FIG. 7, the parameter "task_reachability" is equal to (number of reachable target goals)/(total number of target goals). Hence, if all targets are reachable, then the value of the parameter "task_reachability" is equal to 1.

At 618, the optimization engine or the multi-robot environment simulator determines whether the perturbed candidate solution I' has a lower associated cost than the candidate solution I.

At 620, in response to a determination that the perturbed candidate solution I' has a lower associated cost than the candidate solution I, the optimization engine replaces the respective candidate solution I in the population of C candidate solutions with the perturbed candidate solution I'. In response to a determination that the perturbed candidate solution I' does not have a lower associated cost than the candidate solution I, the optimization engine leaves the population of C candidate solutions unmodified, passing control directly to 622.

At 622, the optimization engine determines whether an inner loop iteration exit condition has occurred. For example, the optimization engine determines when a convergence has occurred, whether a limit on the number of iterations has been reached, and/or whether a limit on iteration time has been reached. Convergence may be deemed to have occurred where, for example, a standard deviation in cost across the current population of candidate solutions is less than an epsilon value.

If the exit condition has occurred, control passes to 626, where the multi-robot environment simulation method 600 may terminate, for example until invoked again. If the exit condition has not occurred, the control passes to 624 where the optimization engine or the multi-robot environment simulator determines whether there are more candidate solutions in the population of candidate solutions to be perturbed. If there are more candidate solutions in the population of candidate solutions to be perturbed, control returns to 608 where the inner loop counter is incremented and the next candidate solution perturbed and analyzed. If there are no more candidate solutions in the population of candidate solutions to be perturbed, control returns to 606 where the inner loop counter is re-initialized, and another pass through the possibly updated population of candidate solutions may be performed.

The various acts of the multi-robot environment simulation method 600 may repeat for multiple iterations, refining the population of candidate solutions until the exit condition (e.g., convergence) is satisfied.

The While the low-level multi-robot optimization DE method 600 is described in terms of an ordered flow, the various acts or operations will in many implementations be performed concurrently or in parallel.

FIG. 9 shows a data structure 900 that may be employed by a processor-based system in representing a candidate solution in a format that allows perturbation, for example in executing the low level multi-robot optimization DE method 600 (FIG. 6), according to at least one illustrated implementation.

A candidate solution I may be advantageously represented with a vector of numbers, so that the system may perform one or more functions on the numbers to "perturb" the numbers and hence the candidate solution to generate a perturbed candidate solution I'. There are various ways to represent the candidate solutions. One approach is described herein with reference to the data structure 900 illustrated in FIG. 9. A system may employ this approach or other approaches to represent the candidate solutions.

A candidate solution may be represented initially as a two-dimensional (2D) matrix, which will be flattened into a one-dimensional (1D) vector. In the 2D matrix, the rows correspond to tasks. For a problem with T tasks, there are thus T rows. In the 2D matrix, columns correspond to robots and priorities. If there are P priority levels and R robots, there are thus P*R columns. The example illustrated in FIG. 9 has 3 robots, 3 priority levels, and 4 tasks. In use, a particular problem may have a different number of robots, different number of priority levels, and a different number of tasks than that illustrated in FIG. 9. The illustrated example is simplified for ease of understanding.

Each task is allocated to a single robot, which is illustrated in FIG. 9 by each row having exactly one entry that is marked (i.e., marked with an asterisk *), denoting which robot performs that task at which priority. A given robot can perform up to a maximum number of tasks that is specified in the input as a per-robot capacity of tasks. Notably, a given robot but can only perform one task per priority level. That is, there is only one asterisk (*) per column.

The system can flatten the 2D matrix into a 1D vector of length T, with one vector element per task. The vector elements correspond to the "entry number" of the 2D matrix, starting at 1. So for the example illustrated in FIG. 9, task1 has a value of 2, task2 has a value of 13 (the first row has 9 entries, then the allocation for task2 (see asterisk *) is in the $4^{th}$ entry of row 2), task3 has a value of 21, and task4 has a value of 36. Notably, the vector elements are all integers.

The system may normalize the resulting integer vector <2,13,21,36> so that all values are between 0 and 1. For example, the system may divide each value by the total number of entries in the matrix, e.g., P*R*T=36. The resulting normalized real-valued vector is <2/36, 13/36, 21/36, 36/36>, where the individual vector elements sum to 1.

To perturb the candidate real-valued vector V, the system may first take a number (e.g., three) other randomly chosen candidates (e.g., A, B, and C), and represent those randomly chosen candidates (e.g., A, B, and C) with respective normalized 1D vectors, normalized in the same fashion as described immediately above. The system can now compute a perturbed real-valued vector V'. For example, the system may compute the perturbed vector V' as being equal to A+mut*(C−B).

The system may then compute the perturbed candidate Vp, for example by randomly mixing the vector elements of the vector V and the perturbed vector V'. That is, for each element of the perturbed candidate Vp, say Vp[i], the system randomly chooses either V[i] or V'[i]. The choice can be weighted by a parameter that, for example, can skew the choice so that the choice is not 50/50. The system may multiple the perturbed candidate Vp by P*R*T to scale back up to the 1D vector that represents the perturbed candidate. To get from the 1D real-valued vector back to the 2D matrix, the system first rounds the real values to integers. From there, the system can use those integer values to mark up a blank 2D matrix.

Figure 10:
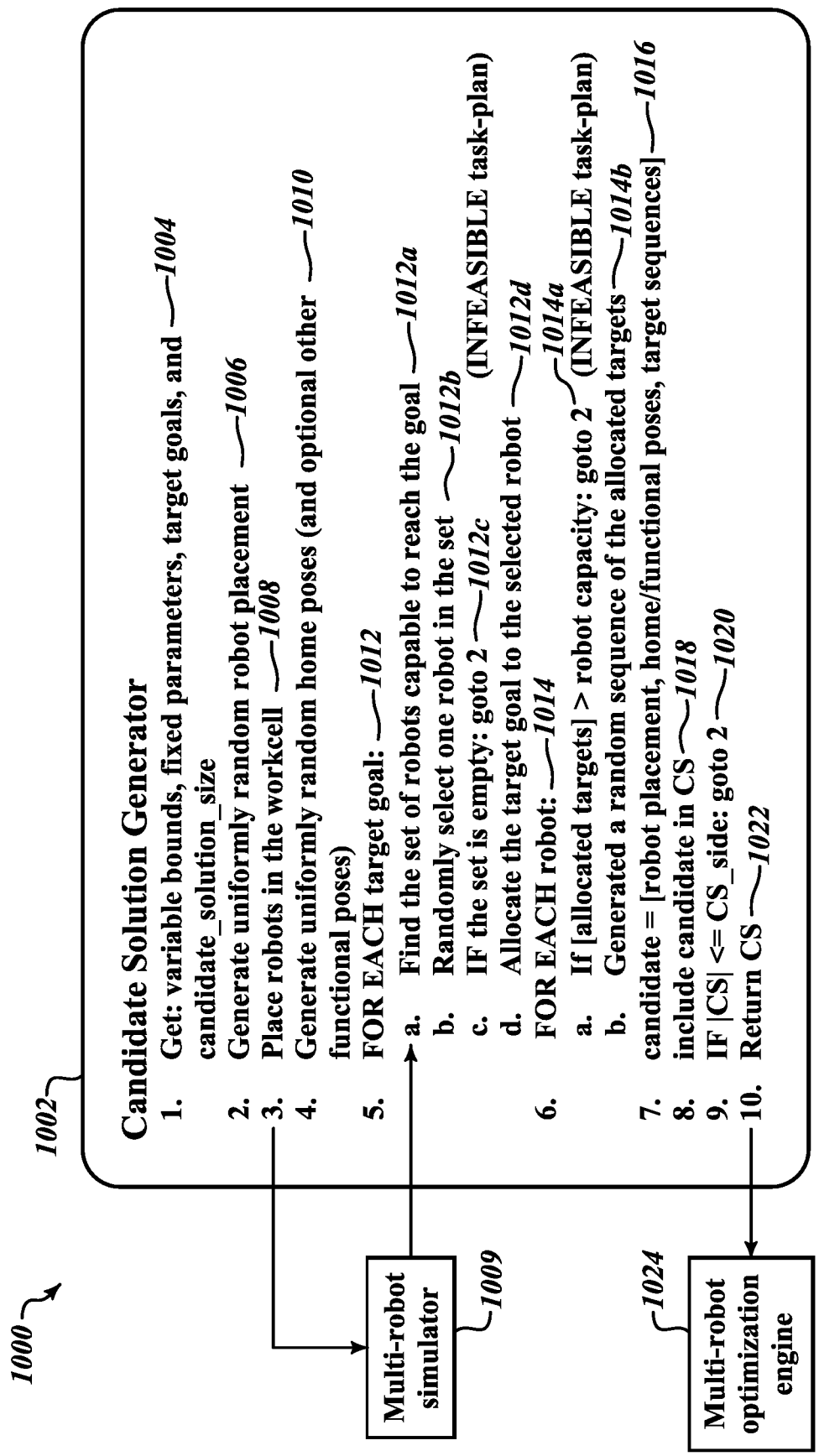
FIG. 10 shows a low-level multi-robot DE candidate solution method of operation of a processor-based system to configure a plurality of robots for a multi-robot operational environment in which a plurality of robots will operate, illustrating in detail the operation of a population generator, according to at least one illustrated implementation.

FIG. 10 shows a low-level multi-robot DE candidate solution method 1000 of operation of a processor-based system to configure a plurality of robots for a multi-robot operational environment in which a plurality of robots will operate illustrating in detail the operation of a population generator, according to at least one illustrated implementation. The processor-based system may comprise at least one processor and at least one non-transitory processor-readable medium that stores at least one of data and processor-executable instructions. When executed by the at least one processor, the processor-executable instructions cause the at least one processor to execute the various operations or acts of the multi-robot DE candidate solution method 1000. The multi-robot DE candidate solution method 1000 may be executed by an optimization engine, which may be implemented by a distinct processor or processors, which is or are dedicated to the optimization engine of a multi-robot environment. Alternatively, the multi-robot environment simulator may be implemented by one or more processors, which perform other operations.

A global optimizer may be based on a multi-variable, mixed integer, optimization algorithm, for example an algorithm known as Differential Evolution (DE). The claims are not limited to such algorithm unless the algorithm is expressly recited in the claims.

The global optimizer optimizes the robot base placement (e.g., in Cartesian coordinates), robot functional poses (e.g., in C-space) and per-robot task plans (ordered list or vector of targets and dwell duration time). The primary optimization goal may be overall latency, but other goals can include optimized use of available floor space, minimum energy usage, etc.

The optimizer system may comprise three components: namely an optimization engine, a multi-robot environment simulator, and a candidate solution generator (e.g., a seed generator).

As described in further detail below, the candidate solution generator generates a population of C candidate solutions, where any given candidate may or may not be viable.

As described in further detail below, the optimization engine tries to find better candidate solutions, for example, by perturbing one of the population of candidate solutions, say candidate P, and seeing if the resulting perturbed candidate P' has a lower cost. If so, the perturbed candidate P' replaces the candidate P in the population. The total number of candidates C does not change.

To find the cost of a candidate solution, the multi-robot environment simulator simulates the candidate solution. A given candidate solution includes an ordered list of tasks for each robot, which is equivalent to an ordered list of trajectories in C-space. Every epoch of time (e.g., 0.1 s or some chosen input value) the multi-robot environment simulator samples the position in C-space of each robot, and employs forward kinematics to check whether the virtual representation of the robot is in collision with itself, with another robot, or with some obstacle or object in the operational environment. The multi-robot environment simulator determines how long the candidate solution would take to be completely executed. The multi-robot environment simulator determines a collision probability or rate (e.g., the fraction of epochs during which there is at least one collision of the robot with itself, with another robot or with an obstacle or object in the operational environment). Note that the generation of the population of candidate solutions does not need to produce collision-free motion plans, but rather simply tracks collision rate. Not requiring collision-free paths greatly speed up processing; however, some implementations can instead produce collision-free paths at this stage. The cost of a candidate is a function of at least these two numbers (e.g., runtime and collision rate). In DE, this cost function is a piecewise-logarithmic value that can be parameterized.

The overall workflow involves a cycle in which the optimizer generates candidates and the simulator evaluates their cost. The process repeats until some convergence criterion, such as the standard deviation in cost being less than some epsilon value.

A candidate solution generator 1002 generates candidate solutions by executing various operations or acts.

At 1004, the candidate solution generator 1002 receives various variable bounds, fixed parameters, tasks or target goals and population sizes. At 1006, the candidate solution generator 1002 generates base positions and orientations for the base of each robot. At 1008, the candidate solution generator 1002 virtually locates or positions the robot bases in the virtual multi-robot operational environment, providing such to a multi-robot simulator 1009, which models the candidate solutions, providing feedback to the candidate solution generator 1002.

At 1010, the candidate solution generator 1002 generates uniformly random home poses and/or other functional poses for each robot.

At 1012, for each task or target goal the candidate solution generator 1002 finds a set of robots capable of completing the task or reaching the target goal at 1012a, randomly selects one of those robots at 1012b, determines whether the set is empty (indicating an infeasible task plan) at 1012c, returning to 1006 if the set is empty, and otherwise allocating the task or target goal to the selected robot at 1012d.

At 1014, for each target robot, the candidate solution generator 1002 determines whether the total number of tasks or target goals allocated to the robot exceeds a limit or task or target capacity specified for the robot at 1014a, returning to 1006 if over-allocated (indicating an infeasible task plan), and otherwise generating a random sequence of the allocated tasks or target goals at 1014b.

At 1016, the candidate solution generator 1002 generates or defines the candidate solution, which may be a vector or other representation that represents base placement and orientation for each robot, home and/or other functional poses for each robot, and a target sequence for each robot.

At 1018, the candidate solution generator 1002 determines whether there are sufficient candidate solutions in the population of candidate solutions. If the number of candidate solutions in the population of candidate solutions is less than a specified number, control may return to 1006 to generate an additional candidate solution. Otherwise, control may pass to 1022, where the candidate solution generator 1002 returns the population of candidate solutions to a multi-robot optimization engine 1024 for further optimization.

Once the initial population of candidate solutions has been generated, the population of candidate solutions may be refined by, for example, perturbing the candidate solutions.

While the low-level multi-robot DE candidate solution method 1000 is described in terms of an ordered flow, the various acts or operations will in many implementations be performed concurrently or in parallel.

The structures and algorithms described herein may, in at least some implementations, operate without cameras or other perception sensors. In at least some implementations, coordination between the robots relies on the geometric models of the robots, the ability of the robots to communicate their respective motion plans, and geometric models of a shared workspace. In other implementations, visual or other perception may optionally be employed, for example to avoid humans or other dynamic obstacles that might enter or occupy portions of the shared workspace.

Wide varieties of algorithms are used to solve motion-planning problems. Each of these algorithms typically need to be able to determine whether a given pose of a robot or a motion from one pose to another pose results in a collision, either with the robot itself or with obstacles in the environment. Virtual collision assessment or checking can be performed "in software" using processors that execute processor-executable instructions from a stored set of processor-executable instructions, to perform an algorithm. Virtual collision assessment or checking can be performed "in hardware" using a set of dedicated hardware circuits (e.g., collision checking circuits implemented in a field programmable gate array (FPGA), application specific integrated circuit (ASIC)). Such circuits may, for example, represent volumes swept by a robot/robotic appendage or portion thereof (i.e., swept volumes) during a respective motion or transition between two states. The circuits may, for example, produce a Boolean evaluation indicative of whether a motion will collide with any obstacles, where at least some of the obstacles represent volumes swept in executing a motion or transition by the other robots operating in the shared workspace.

EXAMPLES

Example 1. A method of operation in a processor-based system to configure a plurality of robots for a multi-robot operational environment in which a plurality of robots will operate, the method comprising:

generating a population of C candidate solutions via a population generator, each of the candidate solutions in the population of C candidate solutions specifying for each of the robots: a respective base position and orientation, a respective set of at least one defined pose, and a respective task or target sequence, where the respective base position and orientation specify a respective position and orientation for a base of the respective robot in the multi-robot operational environment, the respective set of at least one defined pose specifies at least a respective home pose of the respective robot in the multi-robot operational environment, and the respective task or target sequence comprises a respective ordered list of targets for the respective robot to move through to complete a respective sequence of tasks;

performing an optimization on the population of C candidate solutions by an optimization engine that co-optimizes across a set of two or more non-homogenous parameters for two or more of: the respective base position and orientation of the robots, an allocation of the tasks to respective ones of the robots, and the respective task or target sequences for the robots; and providing as output: the respective base position and orientation for each of the robots, a respective task allocation for each of the robots, and a respective motion plan for each of the robots.

Example 2. The method of example 1 wherein providing as output: the respective base position and orientation for each of the robots, a respective task allocation for each of the robots, and a respective motion plan for each of the robots includes providing an optimized task allocation that specifies, for each robot, a respective sequence of tasks to be performed in the form of an optimized ordered list of targets in C-space of the respective robot and one or more dwell time durations at one or more of the targets, and providing an optimized motion plan that specifies a set of collision-free paths, the set of collision-free paths specifying a respective collision-free path between each pair of consecutive targets in the ordered list of targets.

Example 3. The method of any of examples 1 or 2, further comprising:

for each of the candidate solutions of the population C of candidate solutions, determining a respective time to complete the sequences of tasks and a respective collision value that represents a rate or a probability of a collision occurring in completing the sequences of tasks via modeling performed by a robot environment simulator.

Example 4. The method of example 3 wherein performing an optimization on the population of C candidate solutions by an optimization engine that co-optimizes across a set of two or more non-homogenous parameters includes:

selecting one of the candidate solutions via the optimization engine based at least in part on a respective cost associated with the candidate solution, the respective cost based at least in part on the time to complete the sequences of tasks and the collision value determined for the respective candidate solution.

Example 5. The method of example 3 wherein determining a respective time to complete the sequences of tasks and a respective collision value that represents a rate or a probability of a collision occurring via modeling by an optimization engine includes:

virtually performing each task of the sequences of tasks via the multi-robot environment simulator;

for each epoch of a plurality of epochs, sampling a C-space position of a portion of at least one of the robots via the multi-robot environment simulator; and checking for collisions using forward kinematics to identify potential collisions between one or more portions of a respective one of the robots and another portion of the respective one of the robots, between the respective one of the robots and another one of the robots in the environment, and between the respective one of the robots and another object in the multi-robot operational environment that is not another robot.

Example 6. The method of example 5 wherein the ordered list of tasks is equivalent to an ordered list of trajectories in the C-space of the robot and includes a plurality of trajectories, one or more dwell time durations at one or more poses, a home pose, and one or more other defined functional poses in the C-space of the robot, and virtually performing includes virtually executing: the plurality of trajectories and one or more of: one or more dwell time durations at one or more poses, the home pose, or the one or more other defined functional poses.

Example 7. The method of examples 1 or 2, further comprising:

for each of a number of candidate solutions in the population of C candidate solutions, for at least one iteration:
perturbing the respective candidate solution to produce a perturbed candidate solution;
modeling the perturbed candidate solution;
determining whether the perturbed candidate solution has a lower associated cost than the respective candidate solution; and
in response to a determination that the perturbed candidate solution has a lower associated cost than the respective candidate solution, replacing the respective candidate solution in the population of C candidate solutions with the perturbed candidate solution.

Example 8. The method of example 7 repeating the perturbing, the modeling, the determining and the replacing for multiple iterations until an occurrence of a convergence, a limit on the number of iterations or a limit on iteration time is reached.

Example 9. The method of example 7 wherein perturbing the respective candidate solution to produce a perturbed candidate solution includes perturbing a candidate solution vector, the candidate solution vector including a plurality of real number vector elements, one real number vector element for each task, the real number vector elements representing a respective combination of a respective one of the tasks, a priority for the respective one of the tasks and one of the robots identified to perform the respective one of the tasks.

Example 10. The method of examples 1 or 2, further comprising:

receiving input that includes at least one model of the multi-robot operational environment, a respective model of each of at least two of the robots that will operate in the multi-robot operational environment, and a set of tasks or targets.

Example 11. The method of examples 1 or 2, further comprising:

receiving input that includes at least one model of the multi-robot operational environment, a respective model of each of at least two of the robots that will operate in the multi-robot operational environment, a set of tasks or targets, and at least one of: one or more dwell time durations to dwell at one or more targets while at least one of the robots performs at least one task, a set of bounds or constraints on variables, or a set of time intervals that specifies a time limit on simulating collisions.

Example 12. The method of example 11 wherein receiving input includes receiving input that further includes at least one of: a limit on a total number of robots allowed to operate in the multi-robot operational environment and a maximum number of tasks or targets allowed per robot.

Example 13. The method of examples 1 or 2 wherein the population generator is a pseudo-random population generator and wherein generating a population of C candidate solutions via a population seed generator includes pseudo-randomly generating the population of C candidate solutions via the pseudo-random population generator.

Example 14. The method of examples 1 or 2 wherein generating a population of C candidate solutions via a population generator includes generating the population of C candidate solutions with a lower probability of being an invalid candidate solution than a purely pseudo-randomly generated population of C candidate solutions.

Example 15. The method of examples 1 or 2 wherein performing an optimization on the population of C candidate solutions by an optimization engine that co-optimizes across a set of two or more non-homogenous parameters includes selecting an optimized candidate solution with a co-optimized combination of: a respective optimized base position and orientation for the respective base of each of the robots, an optimized task allocation, and an optimized motion plan.

Example 16. A processor-based system to configure a plurality of robots for a multi-robot operational environment in which a plurality of robots will operate, the processor-based system comprising:

at least one processor; and
at least one non-transitory processor-readable medium that stores at least one of data and processor-executable instructions, the processor-executable instructions which, when executed by the at least one processor, cause the processor to execute any of the methods of examples 1 through 15.

Example 17. A processor-based system to configure a plurality of robots for a multi-robot operational environment in which a plurality of robots will operate, the processor-based system comprising:

at least one processor; and
at least one non-transitory processor-readable medium that stores at least one of data and processor-executable instructions, the processor-executable instructions which, when executed by the at least one processor, cause the processor to:
generate a population of C candidate solutions via a population generator, each of the candidate solutions in the population of C candidate solutions specifying for each of the robots: a respective base position and orientation, a respective set of at least one defined pose, and a respective task or target sequence, where the respective base position and orientation specify a respective position and orientation for a base of the respective robot in the multi-robot operational environment, the respective set of at least one defined pose specifies at least a respective home pose of the respective robot in the multi-robot operational environment, and the respective task or target sequence comprises a respective ordered list of targets for the respective robot to move through to complete a respective sequence of tasks;
perform an optimization on the population of C candidate solutions by an optimization engine that co-optimizes across a set of two or more non-homogenous parameters for two or more of: the respective base position and orientation of the robots, an allocation of the tasks to respective ones of the robots, and the respective task or target sequences for the robots; and
provide as output: the respective base position and orientation for each of the robots, a respective task allocation for each of the robots, and a respective motion plan for each of the robots.

Example 18. The processor-based system of example 17 wherein the processor-executable instructions, when executed by the at least one processor, cause the processor to provide as output an optimized task allocation that specifies, for each robot, a respective sequence of tasks to be performed in the form of an optimized ordered list of targets in C-space of the respective robot and one or more dwell time durations at one or more of the targets, and an optimized motion plan that specifies a set of collision-free paths, the set of collision-free paths specifying a respective collision-free path between each pair of consecutive targets in the ordered list of targets.

Example 19. The processor-based system of any of examples 17 or 18 wherein the processor-executable instructions, when executed by the at least one processor, cause the processor further to:

for each of the candidate solutions of the population C of candidate solutions, determine a respective time to complete the sequences of tasks and a respective collision value that represents a rate or a probability of a collision occurring in completing the sequences of tasks via modeling performed by a robot environment simulator.

Example 20. The processor-based system of example 19 wherein to perform an optimization on the population of C candidate solutions by an optimization engine that co-optimizes across a set of two or more non-homogenous parameters, the processor-executable instructions, when executed by the at least one processor, cause the processor to:

select one of the candidate solutions via the optimization engine based at least in part on a respective cost associated with the candidate solution, the respective cost based at least in part on the time to complete the sequences of tasks and the collision value determined for the respective candidate solution.

Example 21. The processor-based system of example 19 wherein to determine a respective time to complete the sequences of tasks and a respective collision value that represents a rate or a probability of a collision occurring via modeling by an optimization engine, the processor-executable instructions, when executed by the at least one processor, cause the processor to:

virtually perform each task of the sequences of tasks via the multi-robot environment simulator;

for each epoch of a plurality of epochs, sample a C-space position of a portion of at least one of the robots via the multi-robot environment simulator; and check for collisions using forward kinematics to identify potential collisions between one or more portions of a respective one of the robots and another portion of the respective one of the robots, between the respective one of the robots and another one of the robots in the environment, and between the respective one of the robots and another object in the multi-robot operational environment that is not another robot.

Example 22. The processor-based system of example 21 wherein the ordered list of tasks is equivalent to an ordered list of trajectories in the C-space of the robot and includes a plurality of trajectories, one or more dwell time durations at one or more poses, a home pose, and one or more other defined functional poses in the C-space of the robot, and to virtually perform each task, the processor-executable instructions, when executed by the at least one processor, cause the processor to virtually execute the plurality of trajectories and one or more of: one or more dwell time durations at one or more poses, the home pose, or the one or more other defined functional poses.

Example 23. The processor-based system of examples 17 or 18 wherein the processor-executable instructions, when executed by the at least one processor, cause the processor further to:

for each of a number of candidate solutions in the population of C candidate solutions, for at least one iteration:
perturb the respective candidate solution to produce a perturbed candidate solution;
model the perturbed candidate solution;
determine whether the perturbed candidate solution has a lower associated cost than the respective candidate solution; and
in response to a determination that the perturbed candidate solution has a lower associated cost than the respective candidate solution, replace the respective candidate solution in the population of C candidate solutions with the perturbed candidate solution.

Example 24. The processor-based system of example 23 wherein the processor-executable instructions, when executed by the at least one processor, cause the processor further to repeat the perturbation, the modeling, the determination and the replacement for multiple iterations until an occurrence of a convergence, a limit on the number of iterations or a limit on iteration time is reached.

Example 25. The processor-based system of example 23 wherein to perturb the respective candidate solution to produce a perturbed candidate solution the processor-executable instructions, when executed by the at least one processor, cause the processor to perturb a candidate solution vector, the candidate solution vector including a plurality of real number vector elements, one real number vector element for each task, the real number vector elements representing a respective combination of a respective one of the tasks, a priority for the respective one of the tasks and one of the robots identified to perform the respective one of the tasks.

Example 26. The processor-based system of examples 17 or 18 wherein the processor-executable instructions, when executed by the at least one processor, cause the processor further to:

receive input that includes at least one model of the multi-robot operational environment, a respective model of each of at least two of the robots that will operate in the multi-robot operational environment, and a set of tasks or targets.

Example 27. The processor-based system of examples 17 or 18 wherein the processor-executable instructions, when executed by the at least one processor, cause the processor further to:

receive input that includes at least one model of the multi-robot operational environment, a respective model of each of at least two of the robots that will operate in the multi-robot operational environment, a set of tasks or targets, and at least one of: one or more dwell time durations to dwell at one or more targets while at least one of the robots performs at least one task, a set of bounds or constraints on variables, or a set of time intervals that specifies a time limit on simulating collisions.

Example 28. The processor-based system of example 27 wherein the processor-executable instructions, when executed by the at least one processor, cause the processor further to receive as input at least one of: a limit on a total number of robots allowed to operate in the multi-robot operational environment and a maximum number of tasks or targets allowed per robot.

Example 29. The processor-based system of examples 17 or 18 wherein the population generator is a pseudo-random population generator and wherein generation of a population of C candidate solutions via a population seed generator includes pseudo-randomly generation of the population of C candidate solutions via the pseudo-random population generator.

Example 30. The processor-based system of examples 17 or 18 wherein generation of a population of C candidate solutions via a population generator includes generation of the population of C candidate solutions with a lower probability of being an invalid candidate solution than a purely pseudo-randomly generated population of C candidate solutions.

Example 31. The processor-based system of examples 17 or 18 wherein to perform an optimization on the population of C candidate solutions by an optimization engine that co-optimizes across a set of two or more non-homogenous parameters the processor-executable instructions, when executed by the at least one processor, cause the processor to select an optimized candidate solution with a co-optimized combination of: a respective optimized base position and orientation for the respective base of each of the robots, an optimized task allocation, and an optimized motion plan.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. patent application Ser. No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES"; U.S. Patent Application No. 62/865,431, filed Jun. 24, 2019, entitled "MOTION PLANNING FOR MULTIPLE ROBOTS IN SHARED WORKSPACE"; AND U.S. Patent Application No. 62/964,405, filed Jan. 22, 2020, entitled "CONFIGURATION OF ROBOTS IN MULTI-ROBOT OPERATIONAL ENVIRONMENT" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based system to configure a plurality of robots for a multi-robot operational environment in which a plurality of robots will operate, the method comprising:

generating a population of C candidate solutions via a population generator, each of the candidate solutions in the population of C candidate solutions specifying for each of the robots: a respective base position and orientation, a respective set of at least one defined pose, and a respective target sequence, where the respective base position and orientation specify a respective position and orientation for a base of the respective robot in the multi-robot operational environment, the respective set of at least one defined pose specifies at least a respective home pose of the respective robot in the multi-robot operational environment, and the respective target sequence comprises a respective ordered list of targets for the respective robot to move through to complete a respective sequence of tasks;

performing an optimization on the population of C candidate solutions by an optimization engine that co-optimizes across a set of two or more non-homogenous parameters for two or more of: the respective base position and orientation of the robots, an allocation of the tasks to respective ones of the robots, and the respective target sequences for the robots;

providing as output: the respective base position and orientation for each of the robots, a respective task allocation for each of the robots, and a respective motion plan for each of the robots; and operating the plurality of robots in accordance with the output.

2. The method of claim 1 wherein providing as output: the respective base position and orientation for each of the robots, a respective task allocation for each of the robots, and a respective motion plan for each of the robots includes providing an optimized task allocation that specifies, for each robot, a respective sequence of tasks to be performed in the form of an optimized ordered list of targets in C-space of the respective robot and one or more dwell time durations at one or more of the targets, and providing an optimized motion plan that specifies a set of collision-free paths, the set of collision-free paths specifying a respective collision-free path between each pair of consecutive targets in the ordered list of targets.

3. The method of claim 1, further comprising:

for each of the candidate solutions of the population C of candidate solutions, determining a respective time to complete the sequences of tasks and a respective collision value that represents a rate or a probability of a collision occurring in completing the sequences of tasks via modeling performed by a robot environment simulator.

4. The method of claim 3 wherein performing an optimization on the population of C candidate solutions by an optimization engine that co-optimizes across a set of two or more non-homogenous parameters includes:
selecting one of the candidate solutions via the optimization engine based at least in part on a respective cost associated with the candidate solution, the respective cost based at least in part on the time to complete the sequences of tasks and the collision value determined for the respective candidate solution.

5. The method of claim 3 wherein determining a respective time to complete the sequences of tasks and a respective collision value that represents a rate or a probability of a collision occurring via modeling by an optimization engine includes:
virtually performing each task of the sequences of tasks via the multi-robot environment simulator;
for each epoch of a plurality of epochs, sampling a C-space position of a portion of at least one of the robots via the multi-robot environment simulator; and
checking for collisions using forward kinematics to identify potential collisions between one or more portions of a respective one of the robots and another portion of the respective one of the robots, between the respective one of the robots and another one of the robots in the environment, and between the respective one of the robots and another object in the multi-robot operational environment that is not another robot.

6. The method of claim 5 wherein the ordered list of tasks is equivalent to an ordered list of trajectories in the C-space of the robot and includes a plurality of trajectories, one or more dwell time durations at one or more poses, a home pose, and one or more other defined functional poses in the C-space of the robot, and virtually performing includes virtually executing: the plurality of trajectories and one or more of: the one or more dwell time durations at one or more poses, the home pose, or the one or more other defined functional poses.

7. The method of claim 1, further comprising:
for each of a number of candidate solutions in the population of C candidate solutions, for at least one iteration:
perturbing the respective candidate solution to produce a perturbed candidate solution;
modeling the perturbed candidate solution;
determining whether the perturbed candidate solution has a lower associated cost than the respective candidate solution;
in response to a determination that the perturbed candidate solution has a lower associated cost than the respective candidate solution, replacing the respective candidate solution in the population of C candidate solutions with the perturbed candidate solution; and
repeating the perturbing, the modeling, the determining and the replacing for multiple iterations until an occurrence of a convergence, a limit on the number of iterations or a limit on iteration time is reached.

8. The method of claim 7 wherein perturbing the respective candidate solution to produce a perturbed candidate solution includes perturbing a candidate solution vector, the candidate solution vector including a plurality of real number vector elements, one real number vector element for each task, the real number vector elements representing a respective combination of a respective one of the tasks, a priority for the respective one of the tasks and one of the robots identified to perform the respective one of the tasks.

9. The method of claim 1, further comprising:
receiving input that includes at least one model of the multi-robot operational environment, a respective model of each of at least two of the robots that will operate in the multi-robot operational environment, a set of tasks, and at least one of: one or more dwell time durations to dwell at one or more targets while at least one of the robots performs at least one task, a set of bounds or constraints on variables, a set of time intervals that specifies a time limit on simulating collisions, or one of either a limit on a total number of robots allowed to operate in the multi-robot operational environment or a maximum number of tasks allowed per robot.

10. The method of claim 1 wherein the population generator is a pseudo-random population generator and wherein generating a population of C candidate solutions via a population seed generator includes pseudo-randomly generating the population of C candidate solutions via the pseudo-random population generator.

11. The method of claim 1 wherein generating a population of C candidate solutions via a population generator includes generating the population of C candidate solutions with a lower probability of being an invalid candidate solution than a purely pseudo-randomly generated population of C candidate solutions.

12. The method of claim 1 wherein performing an optimization on the population of C candidate solutions by an optimization engine that co-optimizes across a set of two or more non-homogenous parameters includes selecting an optimized candidate solution with a co-optimized combination of: a respective optimized base position and orientation for the respective base of each of the robots, an optimized task allocation, and an optimized motion plan.

13. A processor-based system to configure a plurality of robots for a multi-robot operational environment in which a plurality of robots will operate, the processor-based system comprising:
at least one processor; and
at least one non-transitory processor-readable medium that stores processor-executable instructions which, when executed by the at least one processor, cause the processor to:
generate a population of C candidate solutions via a population generator, each of the candidate solutions in the population of C candidate solutions specifying for each of the robots: a respective base position and orientation, a respective set of at least one defined pose, and a respective target sequence, where the respective base position and orientation specify a respective position and orientation for a base of the respective robot in the multi-robot operational environment, the respective set of at least one defined pose specifies at least a respective home pose of the respective robot in the multi-robot operational environment, and the respective target sequence comprises a respective ordered list of targets for the respective robot to move through to complete a respective sequence of tasks;
perform an optimization on the population of C candidate solutions by an optimization engine that co-optimizes across a set of two or more non-homogenous parameters for two or more of: the respective base position and orientation of the robots, an allocation of the tasks to respective ones of the robots, and the respective target sequences for the robots;

provide as output: the respective base position and orientation for each of the robots, a respective task allocation for each of the robots, and a respective motion plan for each of the robots; and operate the plurality of robots in accordance with the output.

14. The processor-based system of claim 13 wherein the processor-executable instructions, when executed by the at least one processor, cause the processor to provide as output an optimized task allocation that specifies, for each robot, a respective sequence of tasks to be performed in the form of an optimized ordered list of targets in C-space of the respective robot and one or more dwell time durations at one or more of the targets, and an optimized motion plan that specifies a set of collision-free paths, the set of collision-free paths specifying a respective collision-free path between each pair of consecutive targets in the ordered list of targets.

15. The processor-based system of claim 13 wherein the processor-executable instructions, when executed by the at least one processor, cause the processor further to:

for each of the candidate solutions of the population C of candidate solutions, determine a respective time to complete the sequences of tasks and a respective collision value that represents a rate or a probability of a collision occurring in completing the sequences of tasks via modeling performed by a robot environment simulator.

16. The processor-based system of claim 15 wherein to perform an optimization on the population of C candidate solutions by an optimization engine that co-optimizes across a set of two or more non-homogenous parameters, the processor-executable instructions, when executed by the at least one processor, cause the processor to:

select one of the candidate solutions via the optimization engine based at least in part on a respective cost associated with the candidate solution, the respective cost based at least in part on the time to complete the sequences of tasks and the collision value determined for the respective candidate solution.

17. The processor-based system of claim 15 wherein to determine a respective time to complete the sequences of tasks and a respective collision value that represents a rate or a probability of a collision occurring via modeling by an optimization engine, the processor-executable instructions, when executed by the at least one processor, cause the processor to:

virtually perform each task of the sequences of tasks via the multi-robot environment simulator;

for each epoch of a plurality of epochs, sample a C-space position of a portion of at least one of the robots via the multi-robot environment simulator; and check for collisions using forward kinematics to identify potential collisions between one or more portions of a respective one of the robots and another portion of the respective one of the robots, between the respective one of the robots and another one of the robots in the environment, and between the respective one of the robots and another object in the multi-robot operational environment that is not another robot.

18. The processor-based system of claim 17 wherein the ordered list of tasks is equivalent to an ordered list of trajectories in the C-space of the robot and includes a plurality of trajectories, one or more dwell time durations at one or more poses, a home pose, and one or more other defined functional poses in the C-space of the robot, and to virtually perform each task, the processor-executable instructions, when executed by the at least one processor, cause the processor to virtually execute the plurality of trajectories and one or more of: one or more dwell time durations at one or more poses, the home pose, or the one or more other defined functional poses.

19. The processor-based system of claim 13 wherein the processor-executable instructions, when executed by the at least one processor, cause the processor further to:

for each of a number of candidate solutions in the population of C candidate solutions, for at least one iteration:

perturb the respective candidate solution to produce a perturbed candidate solution;

model the perturbed candidate solution;

determine whether the perturbed candidate solution has a lower associated cost than the respective candidate solution; and in response to a determination that the perturbed candidate solution has a lower associated cost than the respective candidate solution, replace the respective candidate solution in the population of C candidate solutions with the perturbed candidate solution.

20. The processor-based system of claim 19 wherein to perturb the respective candidate solution to produce a perturbed candidate solution the processor-executable instructions, when executed by the at least one processor, cause the processor to perturb a candidate solution vector, the candidate solution vector including a plurality of real number vector elements, one real number vector element for each task, the real number vector elements representing a respective combination of a respective one of the tasks, a priority for the respective one of the tasks and one of the robots identified to perform the respective one of the tasks.

21. The processor-based system of claim 13 wherein the processor-executable instructions, when executed by the at least one processor, cause the processor further to:

receive input that includes at least one model of the multi-robot operational environment, a respective model of each of at least two of the robots that will operate in the multi-robot operational environment, a set of tasks, and at least one of: one or more dwell time durations to dwell at one or more targets while at least one of the robots performs at least one task, a set of bounds or constraints on variables, a set of time intervals that specifies a time limit on simulating collisions, or one of either a limit on a total number of robots allowed to operate in the multi-robot operational environment or a maximum number of tasks allowed per robot.

22. The processor-based system of claim 13 wherein the population generator is a pseudo-random population generator and wherein generation of a population of C candidate solutions via a population seed generator includes pseudo-randomly generation of the population of C candidate solutions via the pseudo-random population generator.

23. The processor-based system of claim 13 wherein generation of a population of C candidate solutions via a population generator includes generation of the population of C candidate solutions with a lower probability of being an invalid candidate solution than a purely pseudo-randomly generated population of C candidate solutions.

24. The processor-based system of claim 13 wherein to perform an optimization on the population of C candidate solutions by an optimization engine that co-optimizes across a set of two or more non-homogenous parameters the processor-executable instructions, when executed by the at least one processor, cause the processor to select an optimized candidate solution with a co-optimized combination of: a respective optimized base position and orientation for the respective base of each of the robots, an optimized task allocation, and an optimized motion plan.

\* \* \* \* \*